(12) United States Patent
Yates et al.

(10) Patent No.: US 11,117,286 B2
(45) Date of Patent: Sep. 14, 2021

(54) POWER TOOL APPARATUS AND A METHOD OF USE OF THE SAME

(71) Applicant: Power Box AG, Zug (CH)

(72) Inventors: Adam Yates, Northumberland (GB); Michael Corcoran, Northumberland (GB); Simon Bird, Somerset (GB); Darrell Morris, Somerset (GB); Daniel Pikarski, Somerset (GB)

(73) Assignee: Power Box AG, Zug (CH)

( * ) Notice: Subject to any disclaimer, the term of this patent is extended or adjusted under 35 U.S.C. 154(b) by 330 days.

(21) Appl. No.: 15/958,105

(22) Filed: Apr. 20, 2018

(65) Prior Publication Data

US 2018/0339421 A1  Nov. 29, 2018

(30) Foreign Application Priority Data

Apr. 21, 2017 (GB) ..................................... 1706353
Aug. 24, 2017 (GB) ..................................... 1713581

(51) Int. Cl.
*B23B 47/28* (2006.01)
*B23B 49/00* (2006.01)
(Continued)

(52) U.S. Cl.
CPC .............. *B27C 3/08* (2013.01); *B23B 47/287* (2013.01); *B23B 49/005* (2013.01); *B25F 5/021* (2013.01); *B25H 1/0078* (2013.01); *B27C 3/06* (2013.01); *B23B 2247/10* (2013.01); *B23B 2247/12* (2013.01); *B23Q 1/26* (2013.01); *B25H 1/0057* (2013.01)

(58) Field of Classification Search
CPC ..... B23B 47/287; B23B 47/288; B23B 47/28; B23B 2247/10; B23B 2247/12; B23B 49/005; B23B 49/003; B25H 1/0078; B25H 1/0057; B25F 5/021; B27C 3/06; B27C 3/08; Y10T 408/567; Y10T 408/563

See application file for complete search history.

(56) References Cited

U.S. PATENT DOCUMENTS 5,006,022 A * 4/1991 Miller .................. B25H 1/0042
408/110
6,599,064 B1 * 7/2003 Robinson .............. B23B 47/288
408/110

(Continued)

*Primary Examiner* — Eric A. Gates
*Assistant Examiner* — Chwen-Wei Su
(74) *Attorney, Agent, or Firm* — Woodard, Emhardt, Henry, Reeves & Wagner, LLP

(57) ABSTRACT

The current invention provides apparatus and a method for use with a drill bit to form a hole in a workpiece, said apparatus including a clamping means to clamp a workpiece in which the hole is to be formed in position with the apparatus, a drill bit holder assembly and drive means for rotating the drill bit and moving the same into the workpiece so as to drill the hole at a required angle and depth into the workpiece. Typically the depth of the hole is set in relation to the thickness of the workpiece which is clamped in position at that time and the apparatus includes a first part which is held by a first hand of the user and movable by the user with respect to a second part which is held by a second hand of the user and the relative movement is translated into movement of the drill bit holder to move the rotating drill bit into the workpiece.

12 Claims, 37 Drawing Sheets

(51) Int. Cl.
*B27C 3/08* (2006.01)
*B25H 1/00* (2006.01)
*B25F 5/02* (2006.01)
*B27C 3/06* (2006.01)
*B23Q 1/26* (2006.01)

(56) References Cited

U.S. PATENT DOCUMENTS

| | | | |
|---|---|---|---|
| 7,374,373 B1 * | 5/2008 | Park | B23B 39/003 |
| | | | 408/12 |
| 7,641,424 B1 * | 1/2010 | Sommerfeld | B23D 47/04 |
| | | | 408/103 |
| 8,087,853 B2 * | 1/2012 | Stukuls | B23B 39/161 |
| | | | 408/53 |
| 2008/0298911 A1 * | 12/2008 | Platt | B23B 47/287 |
| | | | 408/115 R |

* cited by examiner

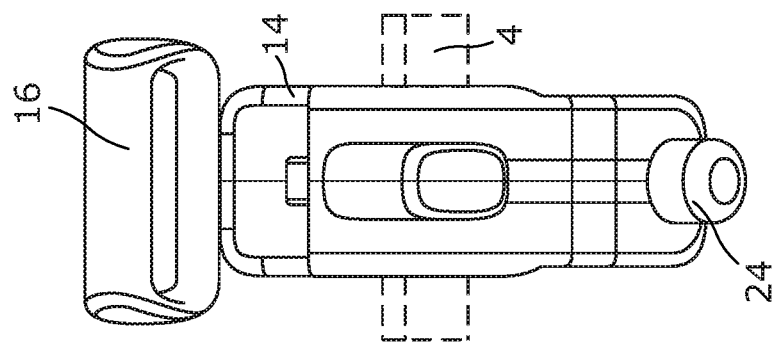
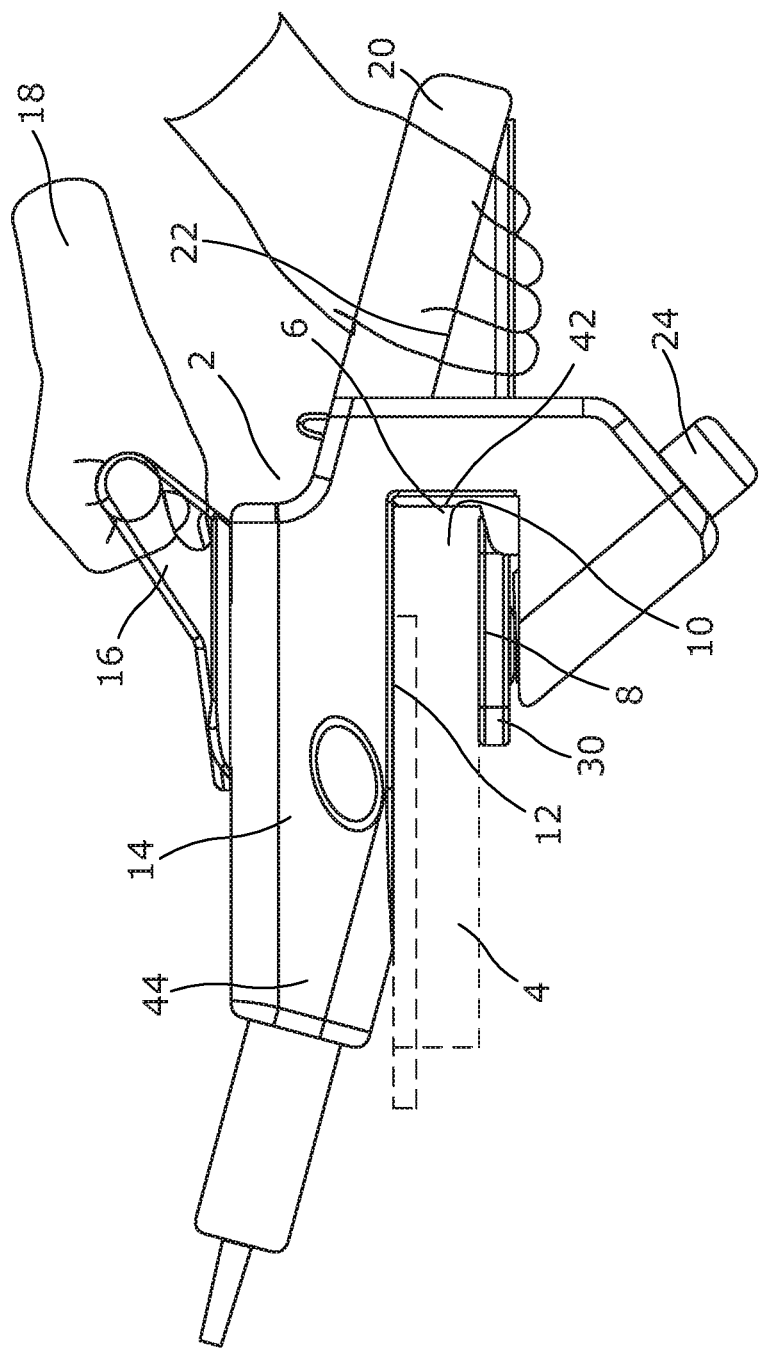

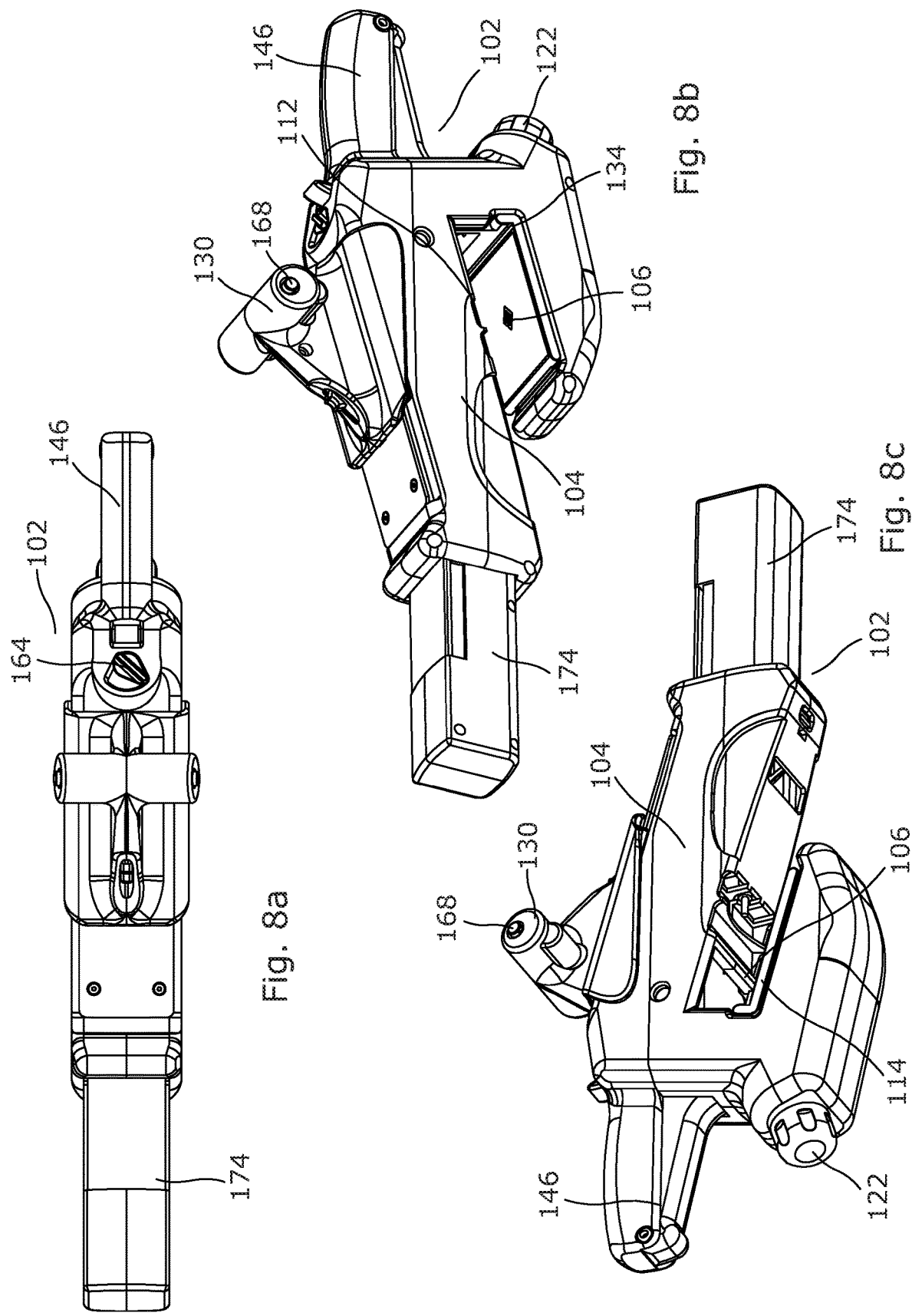

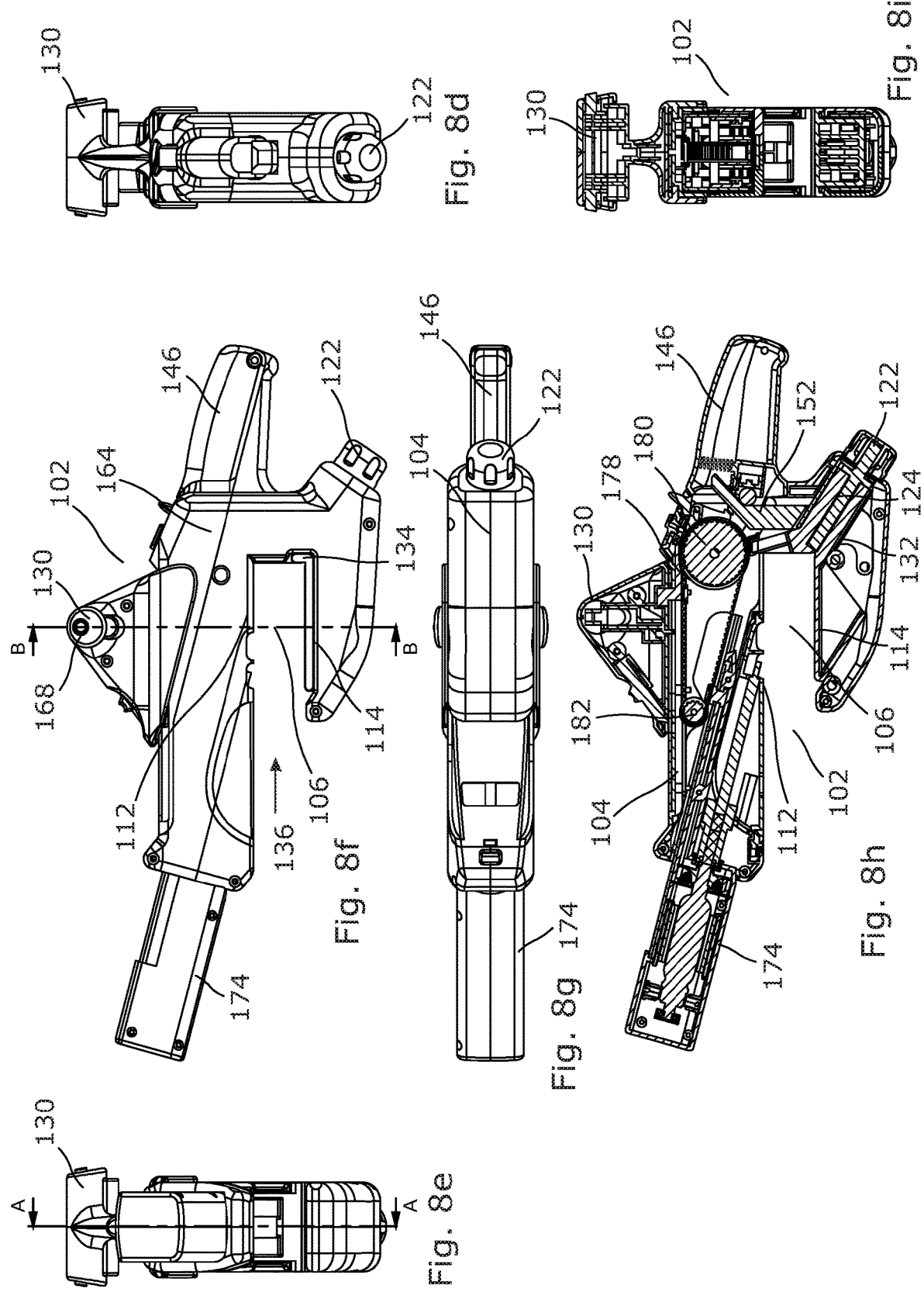

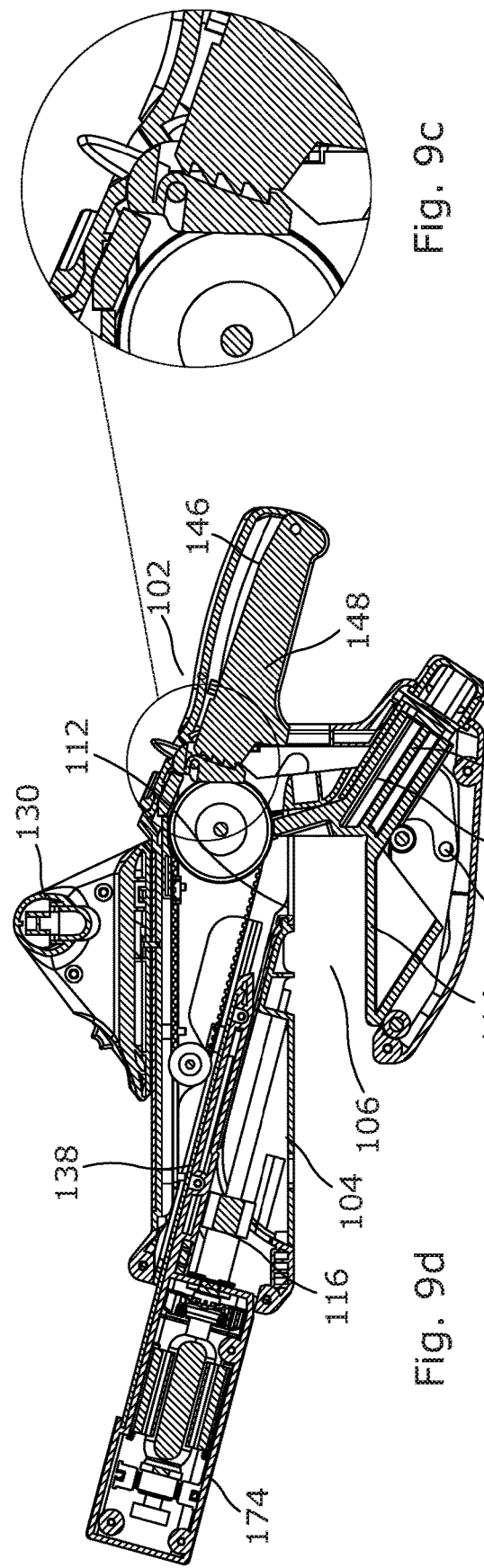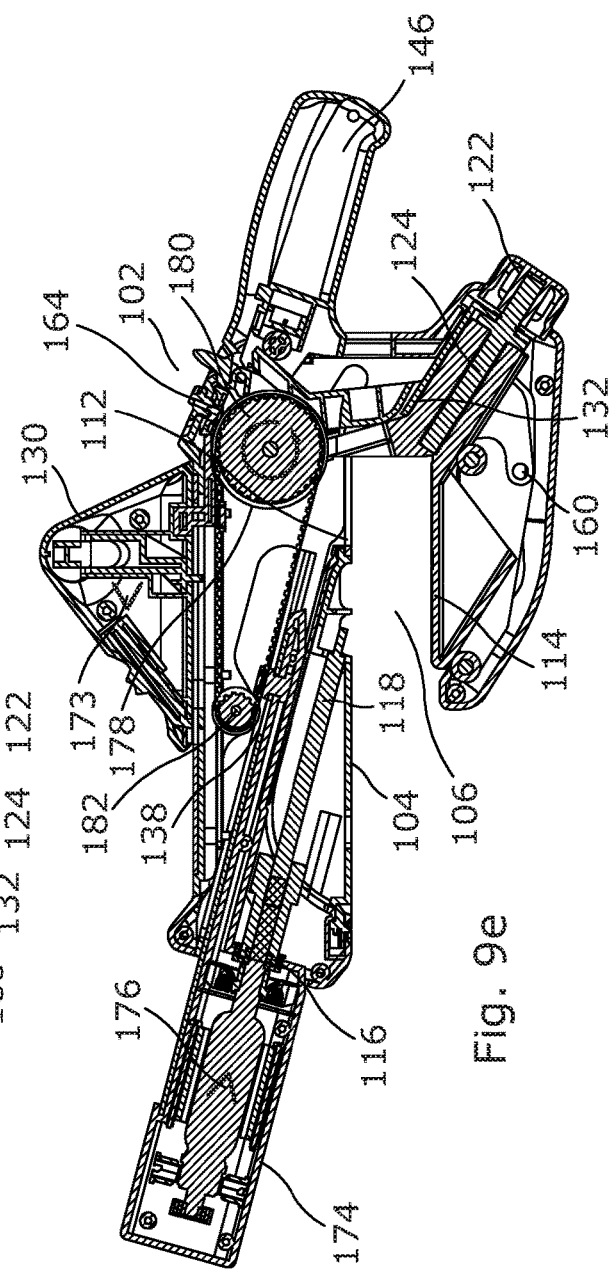

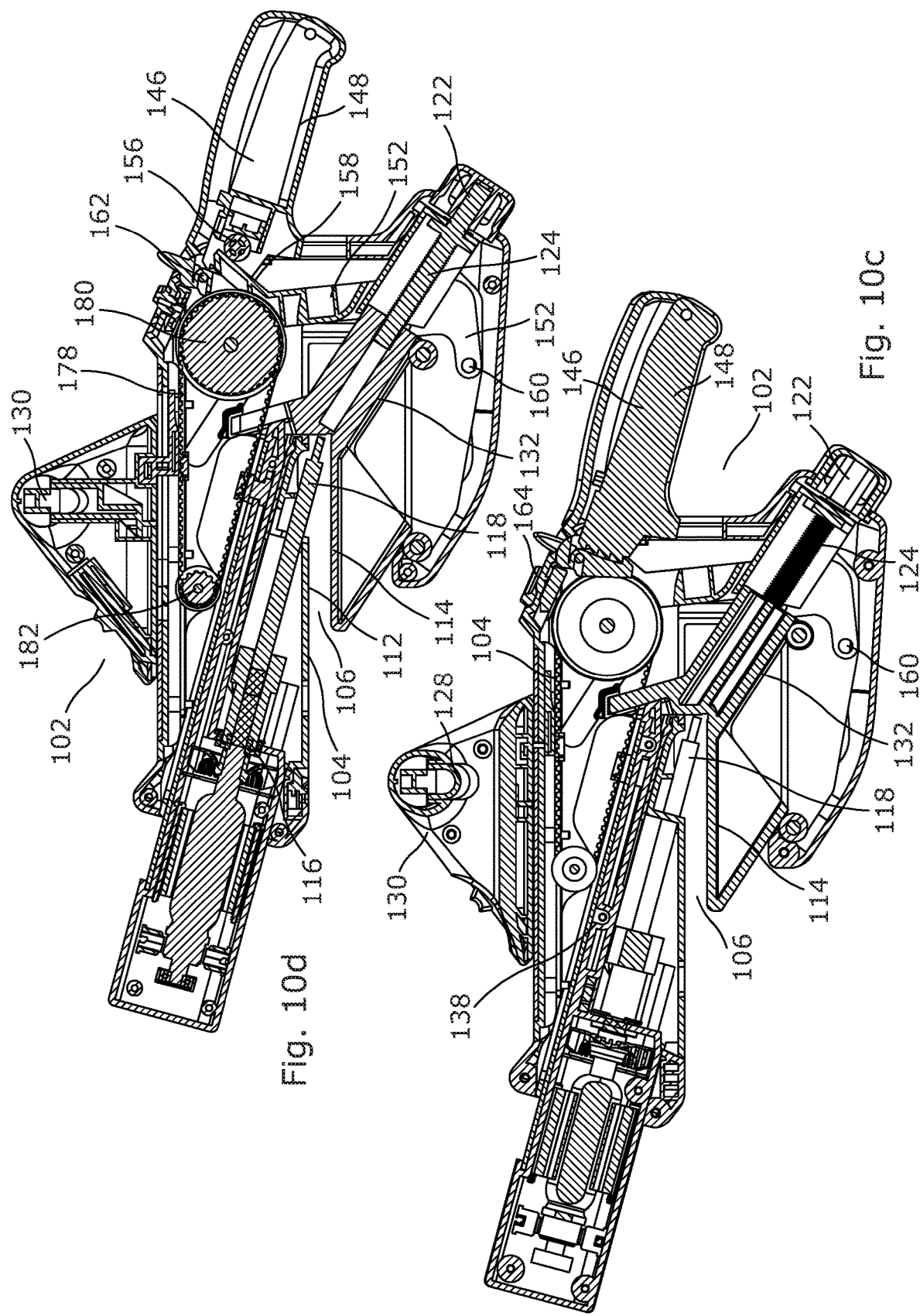

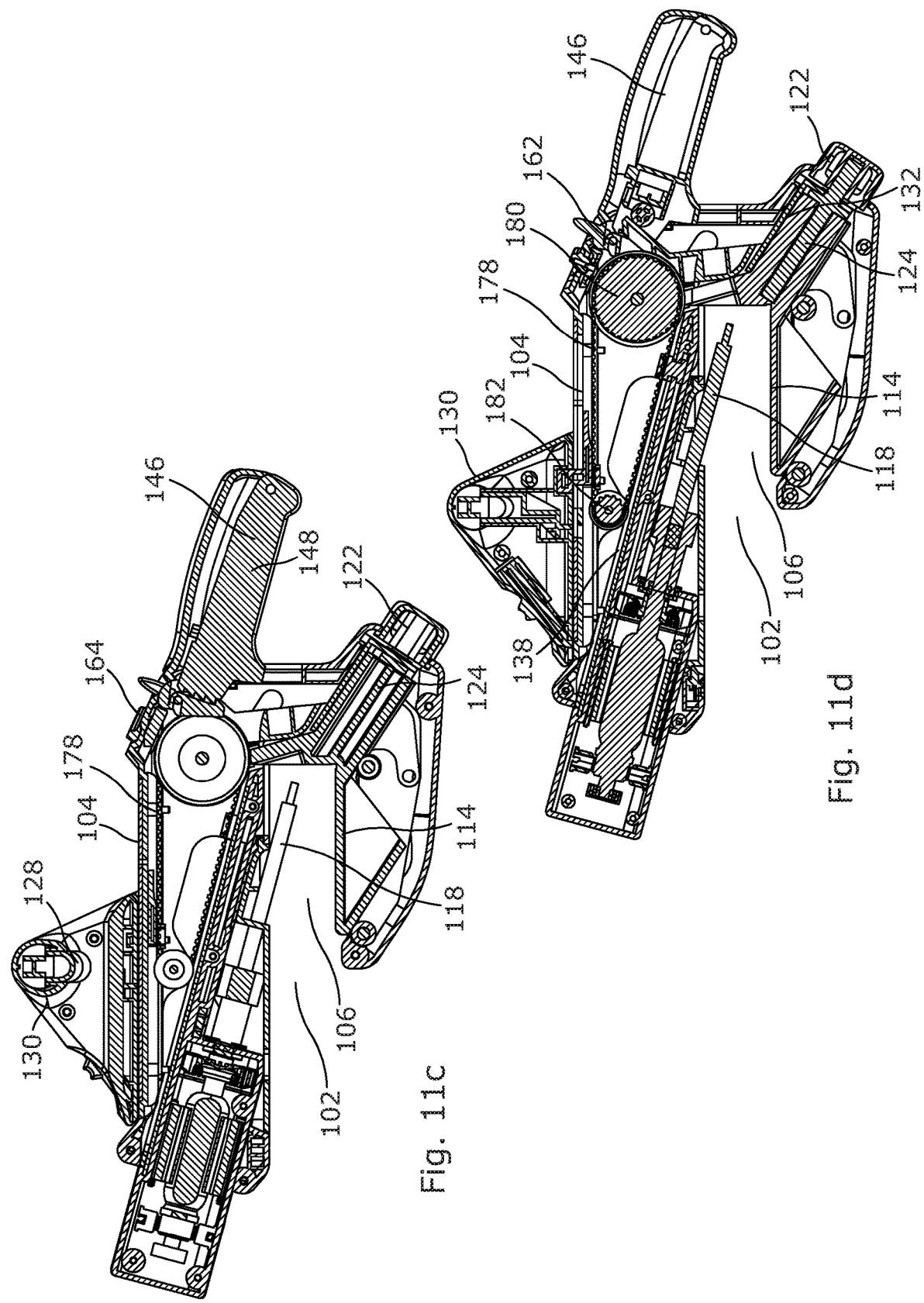

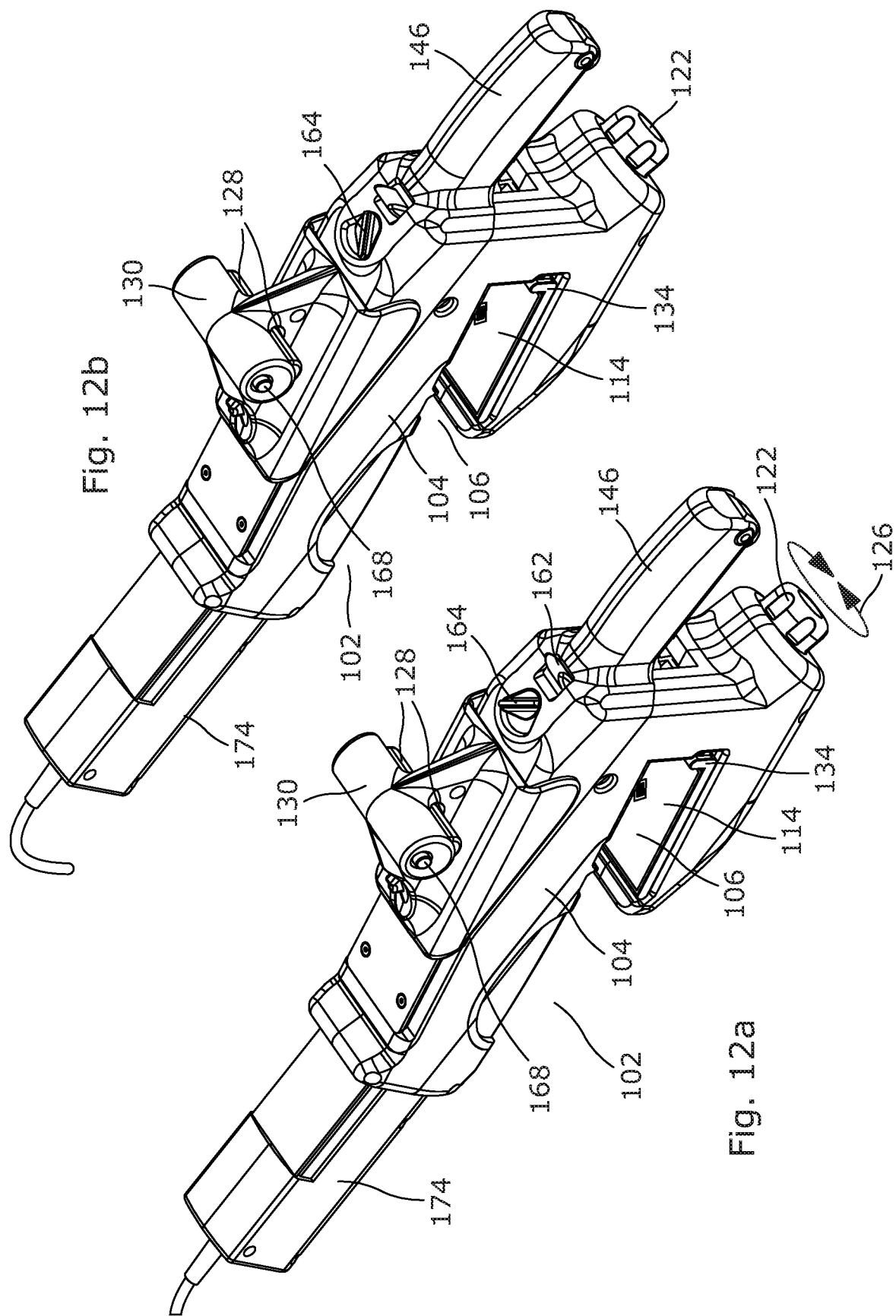

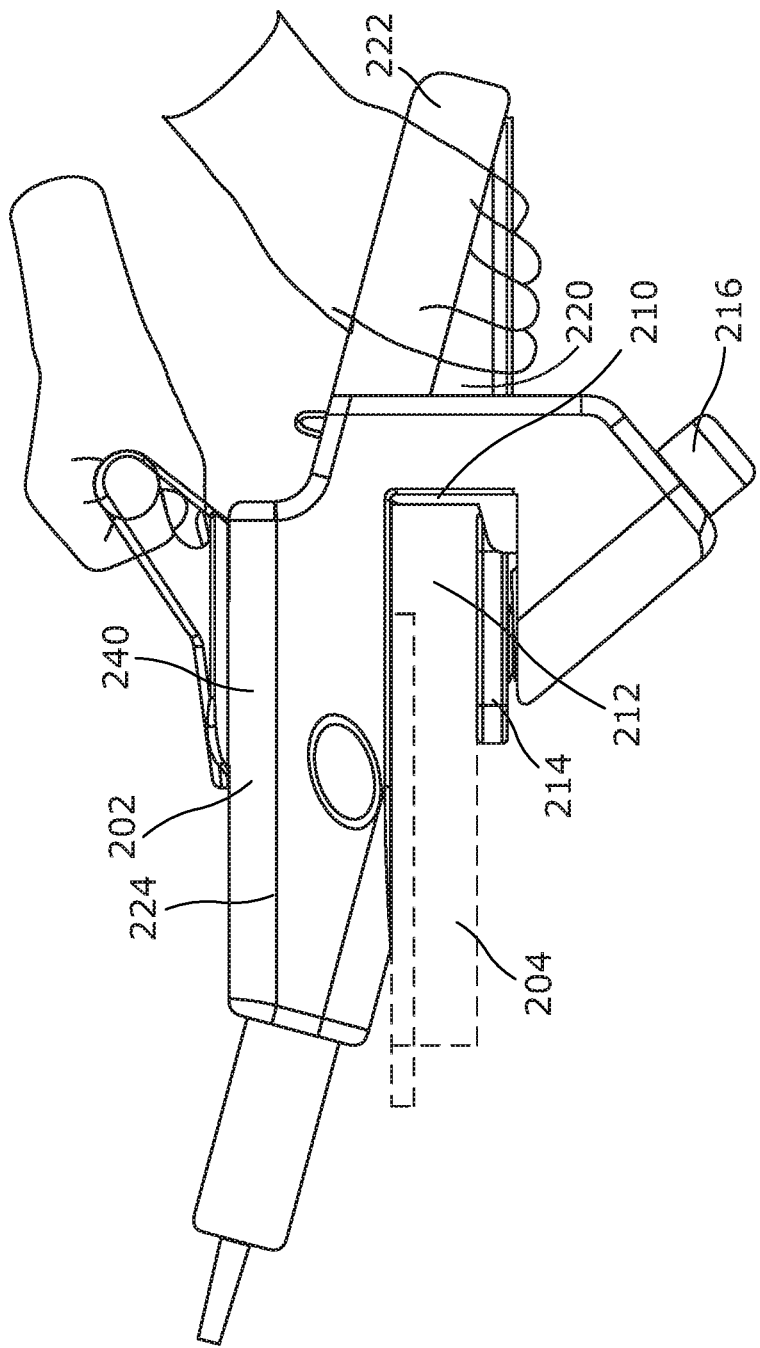
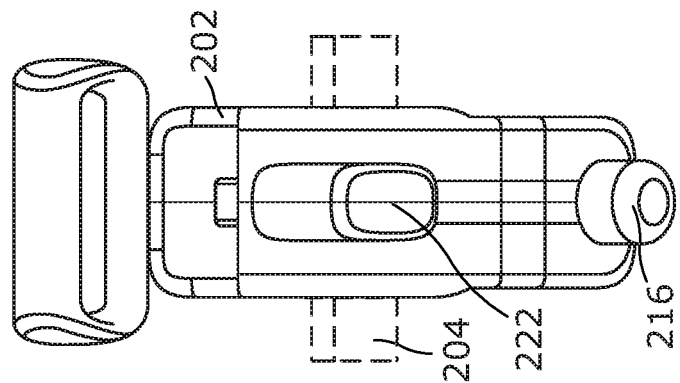
Fig. 15b
Fig. 15c

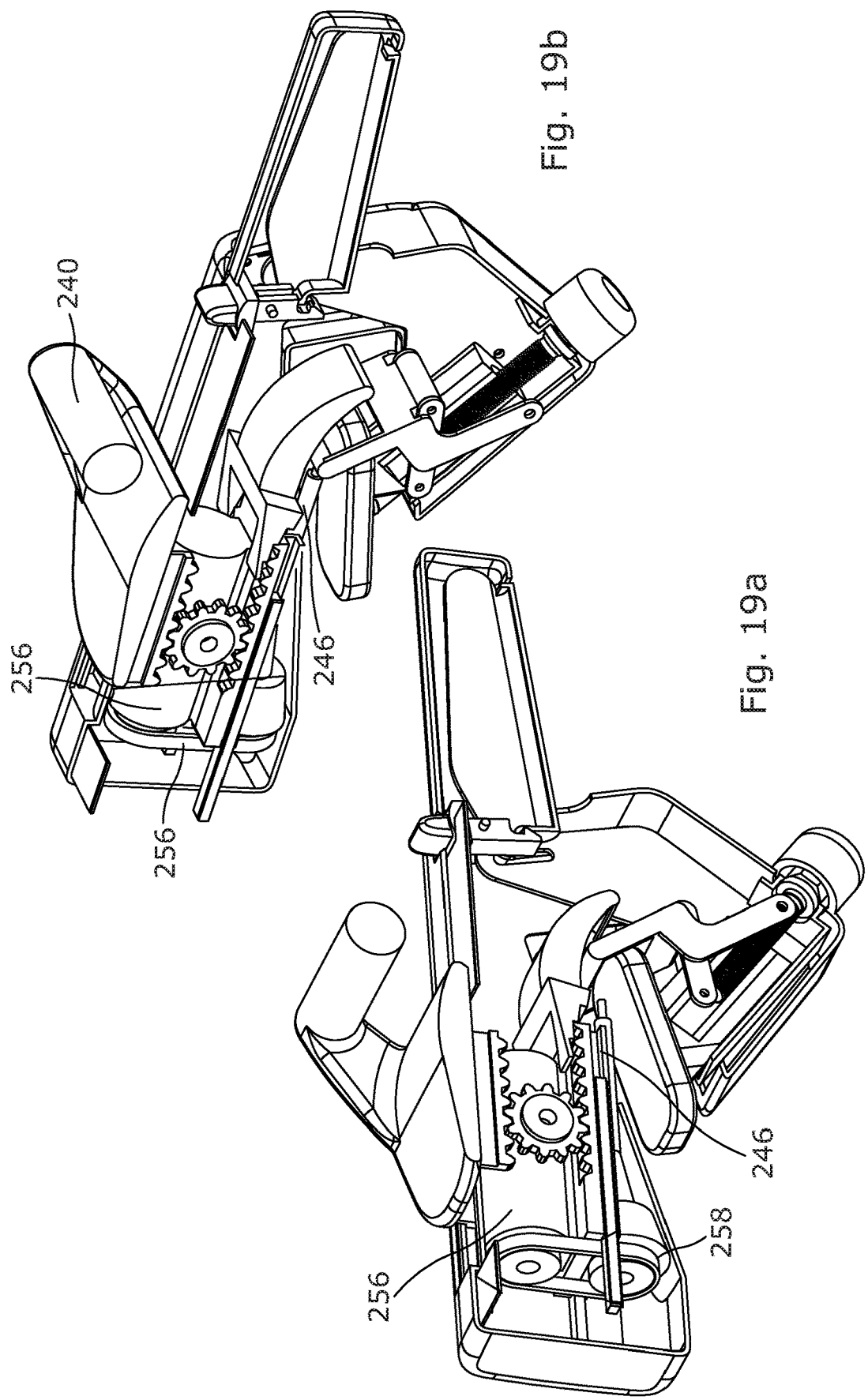

POWER TOOL APPARATUS AND A METHOD OF USE OF THE SAME

FIELD OF THE INVENTION

The invention to which this application relates is power tool apparatus of the type which can be used to form holes in a workpiece and in particular, although not necessarily exclusively, holes of the type which are known as pocket holes.

BACKGROUND

Pocket holes are a type of hole which is formed for the reception of a screw to form a joint between two workpieces, typically formed of wood. The holes are typically formed by drilling into the workpiece adjacent the location at which the joint is to be formed, with the hole having a longitudinal axis at an acute angle, such as 10-20 degrees to the surface in which the drill enters the workpiece. The hole is formed inwardly from the surface of the workpiece such that in one drilling operation there is formed a sub-surface pocket for the screw head, a shoulder for the screw head to bear on and a narrower blind pilot hole to guide a self-cutting screw through the edge of the workpiece of wood into and through the same and into another workpiece to join the workpieces together, and hence form the joint between the edges of the respective workpieces.

The formation of these holes is normally done using a drill and a jig for the guidance of the drill bit which has a tubular steel drill guide which is clamped to the workpiece to guide the stepped drill bit into the wood at an acute angle in order to form the hole to a suitable depth. A key advantage of pocket hole fixing is that even if the joint is also to be glued, the joint which is formed is relatively solid as soon as the screw is tightened and hence there is no need for further clamping or to use adhesive or, if it is used, to wait for the adhesive to cure. However as the conventional jig apparatus can be time consuming to fit and requires a number of different components to be used in conjunction the jig is frequently not used. Furthermore, the use of the apparatus including the jig typically requires a particular number of method steps to be performed and, in particular, after each hole is drilled, the power tool and bit have to be completely withdrawn from the jig and then put down to one side as the wood is repositioned and clamped.

An aim of the present invention is to provide apparatus in a form which allows holes and, in particular, pocket holes to be formed in workpieces which are to be joined together and to allow the apparatus to be provided as a power tool apparatus. A further aim is to allow the holes which are formed to be formed in a guided and repeatable manner to thereby allow the formation of the holes in the required orientation.

A further aim is to reduce the number of method steps which are required to be performed during the use of the jig and the power tool, thereby allowing the drilling procedure to be shortened, whilst maintaining the safety of the use of the apparatus.

SUMMARY

In a first aspect of the invention there is provided a hole drilling apparatus, said apparatus including a drill bit, a motor for selectively providing a driving force to the drill bit, clamping means which when applied to a workpiece in which a hole is to be drilled, clamp the workpiece in position with respect to the apparatus and wherein the apparatus includes a first part which is provided to be movable by the user relative to a second part of the apparatus so as to cause the advancement of the drill bit, as it is driven to rotate, into the work-piece to form the hole.

In one embodiment the first part is movable in a first direction in order to advance the drill bit holder assembly and drill bit into the workpiece in a second direction as the drill bit is driven to rotate and thus form the hole.

In one embodiment the said second direction is substantially opposed to the first direction.

In one embodiment the said second direction is angularly offset to the first direction.

In one embodiment the said user movable part is manually movable with respect to the second part of the apparatus. Alternatively the said movable part is powered to be movable.

In one embodiment the apparatus is provided such that when the drill bit is rotated and advanced into the workpiece which is clamped by the apparatus a pocket hole is formed in the workpiece.

In one embodiment the drill bit is a stepped drill which has at least two different hole forming portions located therealong.

In one embodiment the clamping means allow the apparatus to be clamped with respect to the workpiece such that the hole formed by the drill bit has a longitudinal axis in a range of between 10 and 25°, more preferably 12 to 18° to the surface of the workpiece into which the drill bit is advanced to form the hole.

In one embodiment the apparatus includes an adjustment means which allows the user to selectively move the clamping means to clamp a workpiece which has a thickness within range of thicknesses for which the apparatus is provided to be operable.

In one embodiment the adjustment means includes a threaded shaft with a user actable rod which acts on one part of the clamping means to move the same towards or away from an opposing part of the clamping means and thereby adjust the distance of the spacing between the said parts and hence define the thickness of workpiece which can be positioned between said parts and be clamped.

In one embodiment the adjustment is performed automatically in terms of adjusting the depth of cut and the wood insertion distance by means of a rotating back stop which also controls a motor slide depth stop lever.

In one embodiment the movable part includes a handle which is movable in a first direction in order to advance the drill bit into the workpiece in a second direction as the drill bit is driven to rotate and thus form the hole. In one embodiment the movement of the movable part is linear in the first direction and movement of the drill bit is linear in the second direction and angularly offset to the first direction.

In one embodiment the direction of movement of the handle is substantially parallel to the respective faces of the workpiece which contact with the opposing clamping parts.

In one embodiment the motor moves in conjunction with the drill bit.

In one embodiment the apparatus includes movement translation means which translate the movement force of the movable part to the drill bit. In one embodiment movement translation means includes one or more sprocket gear wheels mounted on the apparatus housing and at least one toothed drive belt.

In one embodiment the apparatus includes a trigger which acts on a rocking/rotating jaw assembly to apply pressure to the work-piece to clamp the same in place with respect to the apparatus during the hole cutting operation.

In one embodiment the trigger can be releasable held in the gripping position by a toothed trigger lock.

In one embodiment the drill bit is supported by a drill guide but alternatively, and preferably, the drill bit is of a dimension and type, such as being short and rigid, in order to allow the motor guides and bearings to provide directional stability for the drill bit and thereby avoid the need for a drill guide to be provided.

In one embodiment the apparatus is portable and operable when held by both hands of a user.

In a further aspect of the invention there is provided a powered hole drilling tool for use in forming a pocket hole in a workpiece, said apparatus including a drill bit holder assembly including a drill bit, a motor for providing a driving force to rotate the drill bit, clamping means to clamp the workpiece with the apparatus, a first part which is movable by the user relative to a second part of the so as to operate a movement translation means and advance the rotating drill bit towards and into the workpiece to form the hole and wherein the said motor, clamping means, first part and movement translation means assembly are formed as integral parts of the said tool.

In one embodiment movement of the first part in a first direction causes movement of the drill bit in a second direction angularly offset to the first direction.

In one embodiment the tool includes a gripping portion and a trigger mechanism which can be selectively operated to control the clamping means.

In a yet further aspect of the invention there is provided apparatus for use with a drill bit to form a hole, said apparatus including a clamping means to clamp a workpiece in which the hole is to be formed in position with respect to a body of the apparatus, means for holding and applying the drill bit into a surface of the workpiece, rotating the drill bit to drill the hole at a required angle and depth into the workpiece with the depth being set in relation to the thickness of the workpiece which is indicated by the position of at least one jaw of the clamping means.

In one embodiment the said workpiece is held in a slot of a size defined by opposing parts or jaws of the clamping means and at least one jaw is moveable with respect to the other jaw of the clamping means so as to match the width of the slot to the thickness of the workpiece.

In one embodiment, a clamping force is exerted as a result of user operation of a trigger mechanism.

In one embodiment a user operable adjustment means is provided to allow adjustment of the said movable jaw and movement of the adjustment means is synchronised with the control of the depth of the hole which is to be formed in the workpiece.

In one embodiment the means for holding and applying the drill bit is slidingly movable with respect to the body of the apparatus so as to advance and withdraw the drill bit into and from the workpiece.

In one embodiment the holding means also include the drive means such as a motor, to which the drill bit is connected in order to allow the same to be rotated as it is advanced into the workpiece.

In one embodiment the motor is electrically driven.

In one embodiment the drill bit is one suitable for forming a pocket hole configuration in the workpiece.

In one embodiment the drill bit is a stepped drill and is advanced linearly into the work-piece at an angle of 12-18 degrees to the surface into which the drill bit enters the workpiece.

In one embodiment the movable part includes a handle assembly which is moved by the user in a first direction with respect to the body and which movement acts to drive the holding means for the drill bit in a second direction, typically the opposite direction.

In one embodiment the drive between the handle assembly and the holding means is imparted by attachment to a toothed belt running around sprocket wheels on axles attached to the body.

In one embodiment the trigger assembly is biased and includes a roller to act on the inclined slot or surface of a lever of the clamping means so as to advance a clamp cradle, thrust bolt and the movable jaw to apply a clamping pressure to the work-piece to keep the workpiece in place during the pocket hole drilling operation.

In one embodiment the trigger assembly includes a user releasable lock which when in a locking position, acts to maintain the trigger in a clamping position.

In one embodiment the apparatus includes an automatic clamp release function which is operated by the handle assembly returning and, as it does so, releasing the trigger lock.

In one embodiment the drill bit utilises the motor guides and bearings for directional stability.

In one embodiment an indicator scale is provided so as to indicate the thickness of the workpiece which is clamped in position.

In a further aspect of the invention there is provided a method of forming a hole in a workpiece, said method comprising providing apparatus including a motor for selectively providing a driving force to a drill bit to rotate the same, moving a part of the apparatus relative to a second part of apparatus to operate movement translation means connected to a holding means for the drill bit to allow the rotating drill bit to be advanced into a workpiece clamped in position on the apparatus by clamping means and wherein the said direction of movement of the movable part is different to the direction of advancement of the drill bit into the workpiece to form the said hole therein.

In a further aspect of the invention there is provided a method of forming a hole in a workpiece, said method comprising the steps of clamping a workpiece between first and second jaws of the apparatus, adjusting one of the jaws to move the same into a clamping position, operating a trigger assembly to exert the clamping force on the workpiece, operating a drive means to rotate a drill bit held on a holding means, moving a handle assembly with respect to the body in a first direction which causes the movement of the holding means and a drill bit in a second direction and into the workpiece to form the hole at the required angle and depth and wherein the said depth of the hole which is formed is associated with the particular thickness of the workpiece which is clamped in position by the clamping means.

BRIEF DESCRIPTION OF THE DRAWINGS

Specific embodiments of the invention are now described with reference to the accompanying drawings; wherein FIGS. 1a and b illustrate plan and elevation views of the apparatus in accordance with one embodiment of the invention in use with respect to a workpiece showing internal components;

FIGS. 2a-c illustrate plan and elevation views of the apparatus in accordance with one embodiment of the invention in use with respect to a workpiece;

FIGS. 8a-i illustrate views of apparatus in accordance with another embodiment of the invention;

FIGS. 9a-e and 11a-d illustrate elevations and cross sectional elevations of the apparatus in accordance with the first embodiment in use with a workpiece of a first depth;

FIGS. 10a-d illustrate elevations and cross sectional elevation of the apparatus in accordance with the first embodiment in use with a workpiece of second depth;

FIGS. 12a and b illustrate perspective views of the apparatus in accordance with the first embodiment;

FIGS. 15a-c illustrate plan views of the apparatus in use in accordance with a second embodiment of the invention;

FIGS. 19a-b and 20 illustrate a further embodiment of apparatus in accordance with the invention;

DETAILED DESCRIPTION OF THE DRAWINGS

Figure 1A:
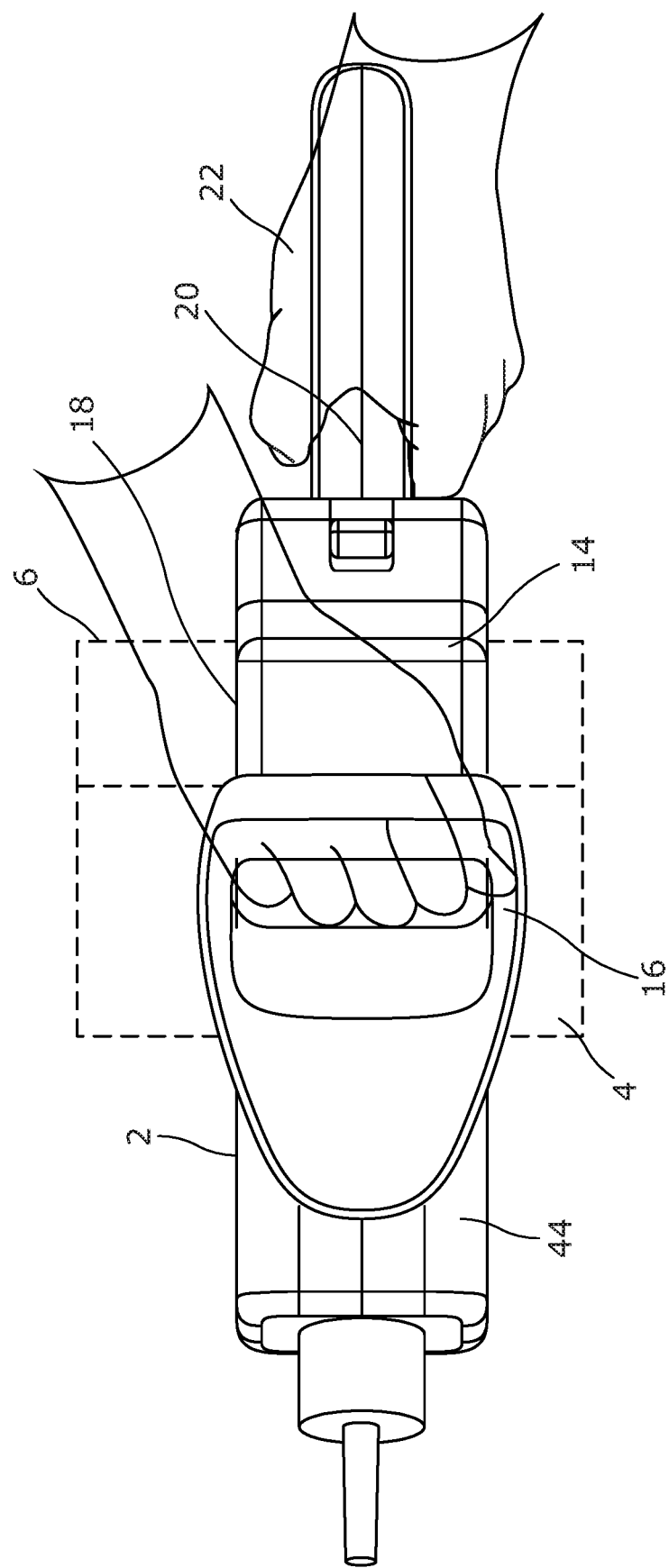

Referring now to the FIGS. 1-7 there is illustrated a first embodiment of apparatus 2 in accordance with the invention. The apparatus is provided for use to drill a pocket hole in a workpiece 4 in the form of a piece of wood in this case. The work piece can have a depth at its edge 6 onto which the apparatus is applied, in the range of 12 mm, as shown in solid lines in FIGS. 3 and 4, to 50 mm thick, as shown in solid lines in FIG. 1b. The apparatus includes location means with a face 8 which allow the workpiece to be located in the recess portion 10 between the lower jaw 30 and the underside 12 of the housing 14. The housing includes a handle 16 to be gripped by the user's hand 18 as shown in FIGS. 1a-2b and a gripping portion 20 to be gripped by the users other hand 22. The movement of the handle 16 in the direction 48 acts to advance the drill bit 36 into the workpiece, and the withdrawal of the drill bit is achieved by the movement of the handle 16 in the opposing direction, which may be spring-assisted, once the hole is cut.

The location means includes a rotational adjustment knob 24 which, when turned by the user, moves, by way of a threaded adjuster screw 26, the plunger 28 and lower jaw 30 of the location means to close onto the surface 38 of the workpiece 4 in the recess portion 10.

Figure 1B:
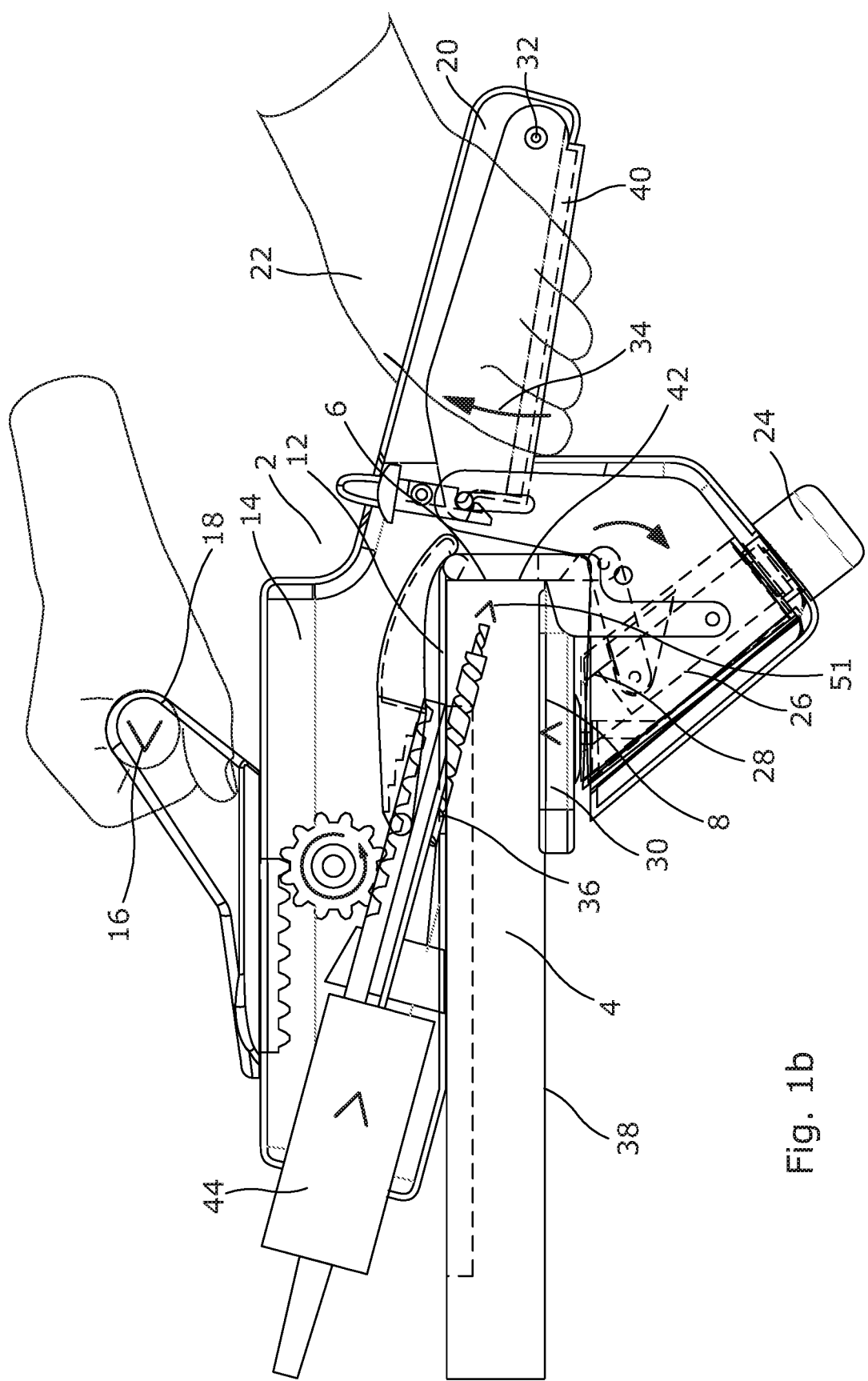
Figure 2A:
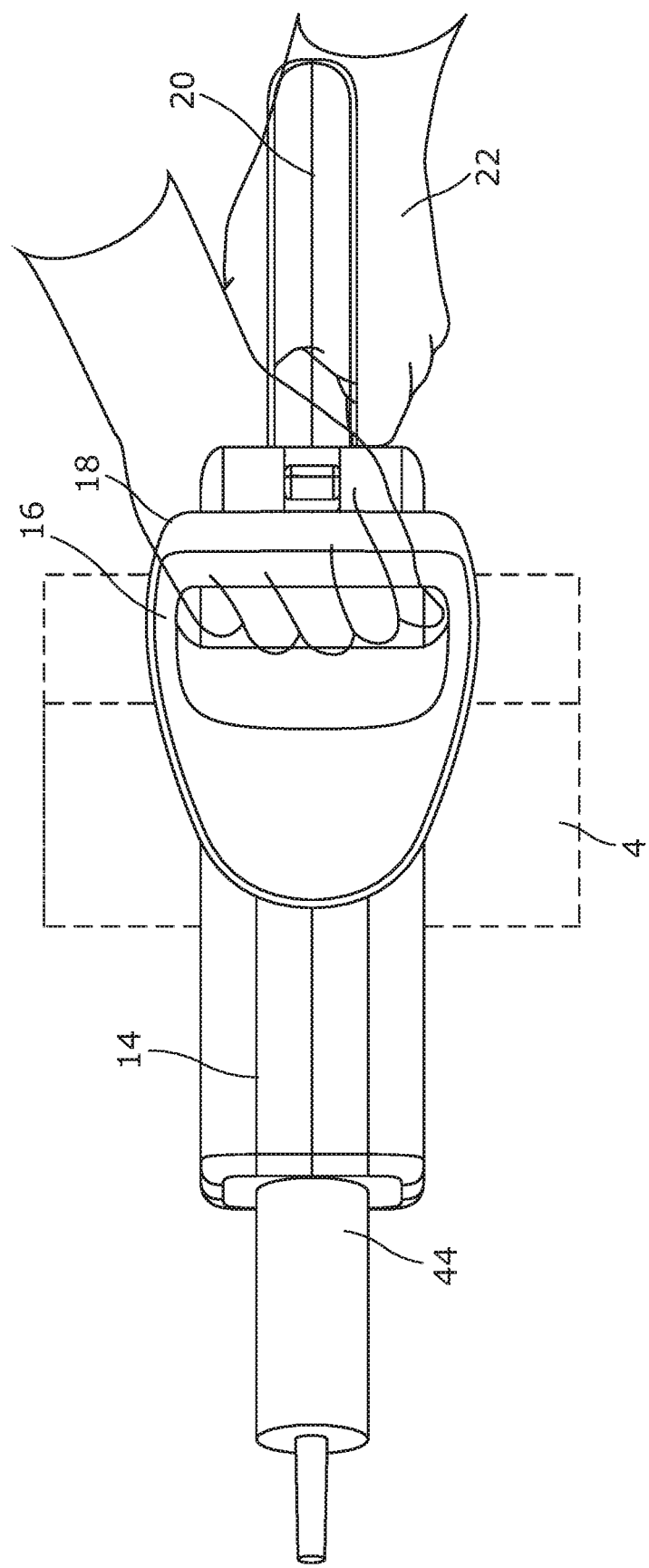
Figure 3:
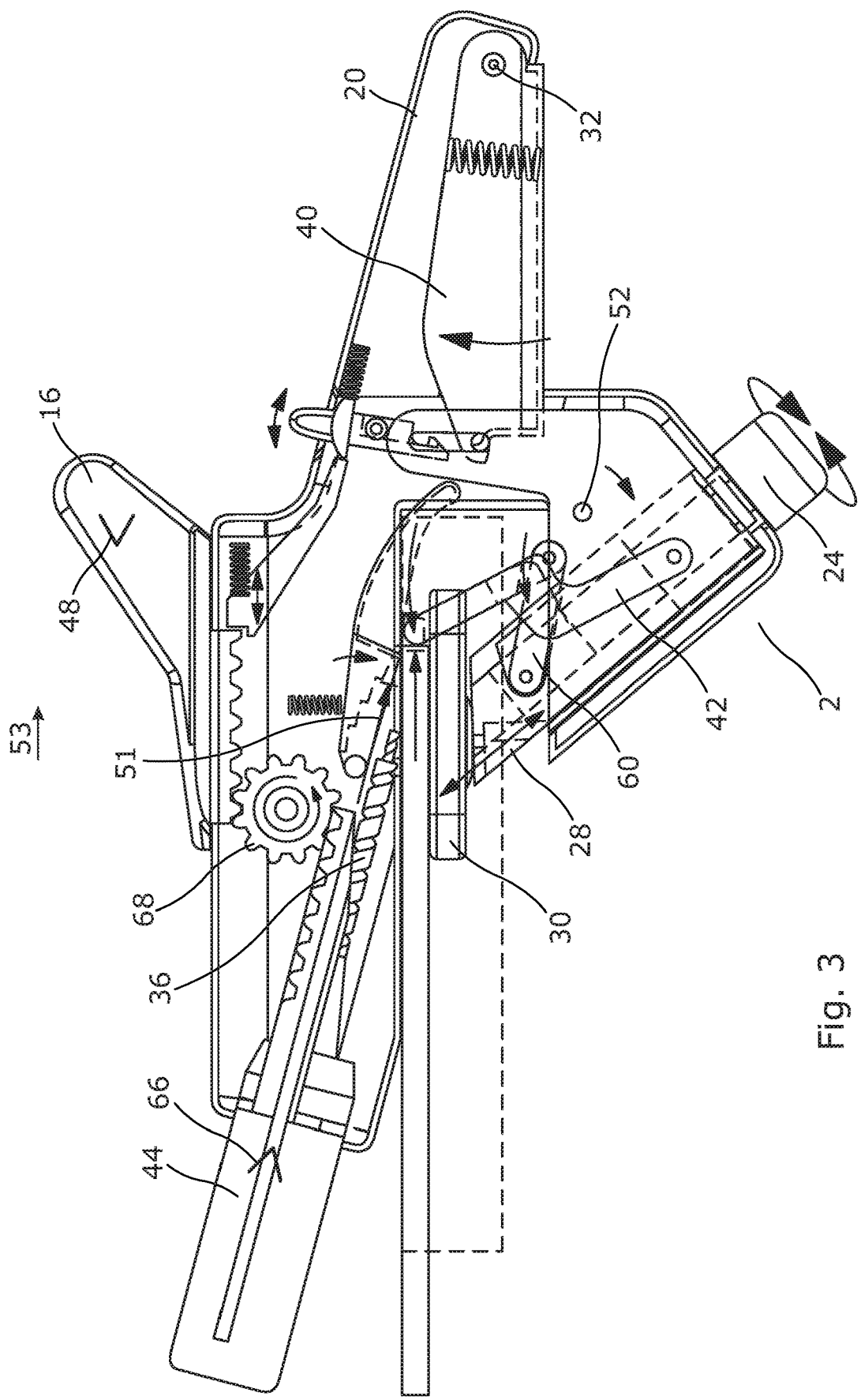
FIG. 3 illustrates the components of the apparatus in accordance with one embodiment of the invention in detail.
Figure 4:
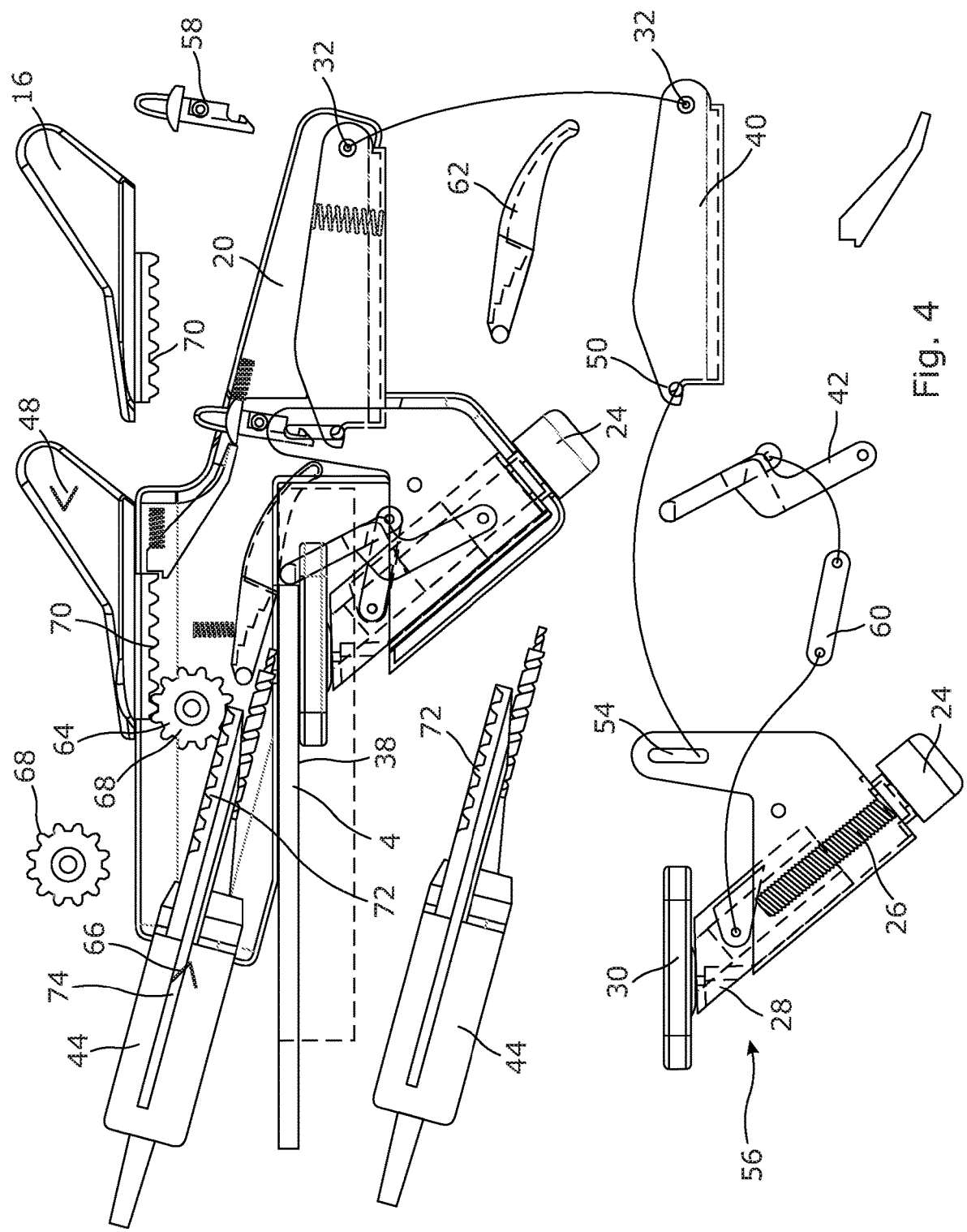
FIG. 4 illustrates an exploded diagram of the components of FIG. 3.
Figure 5:
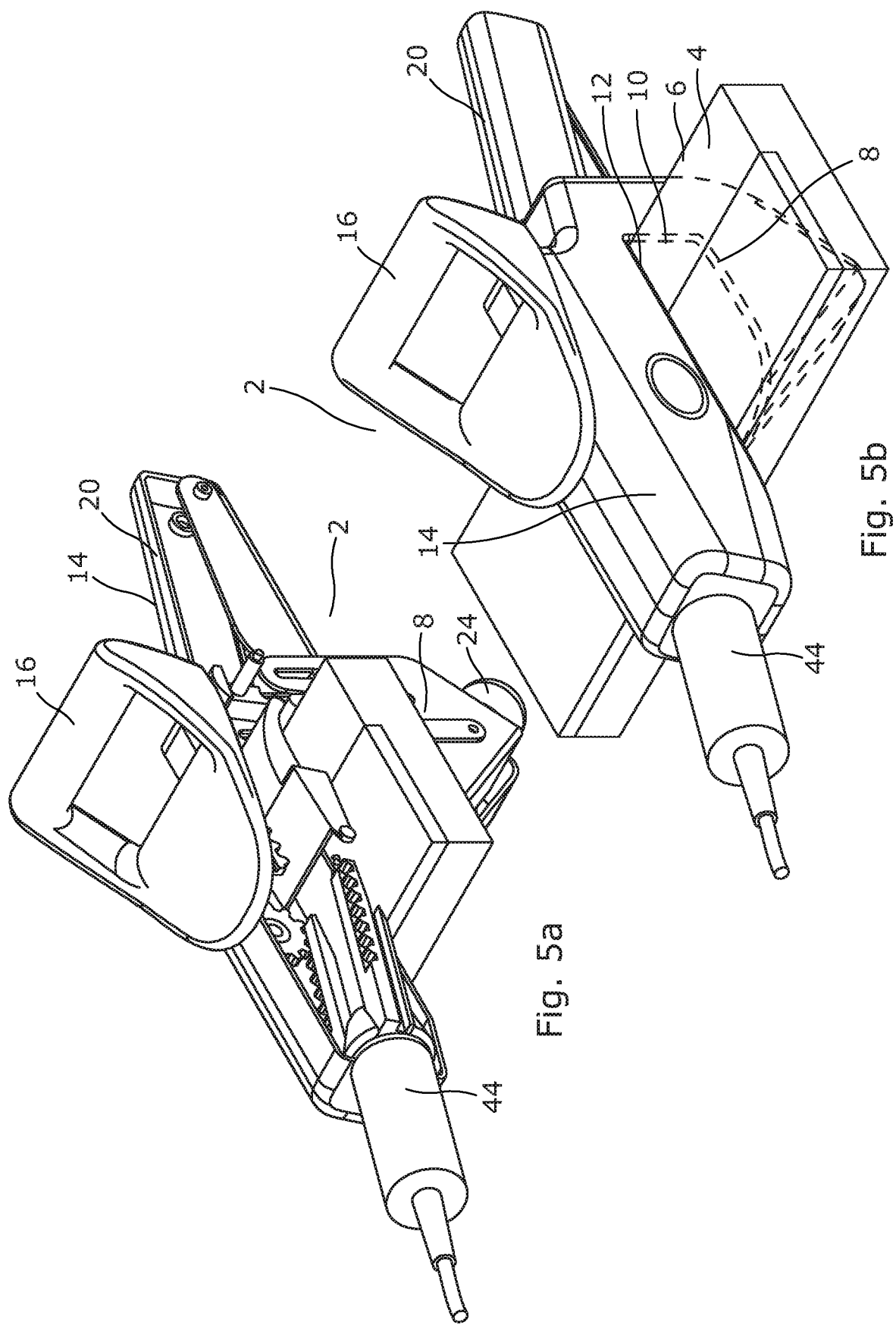
FIGS. 5a and b illustrate perspective views of the apparatus in accordance with the first embodiment of the invention.
Figure 6:
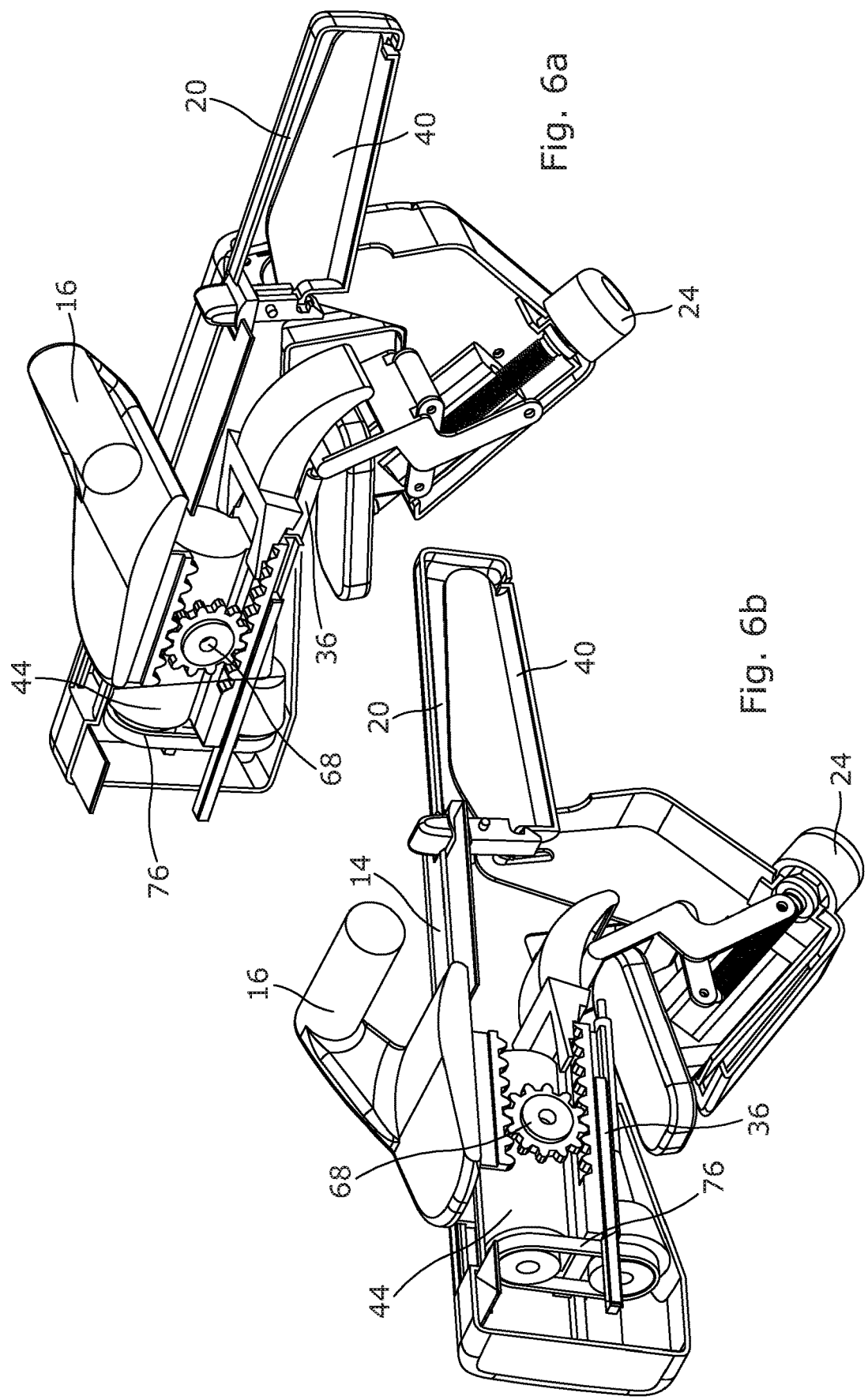
FIGS. 6a and b illustrate an alternative embodiment of apparatus in accordance with the invention.

The adjuster 26 therefore closes any gap between the lower jaw 30 and the workpiece surface 38 and the clamping force to retain the workpiece in position is applied via a trigger 40 mounted on the gripping portion 20 and the trigger is pivotally movable about pivot point 32 as indicated by arrow 34 in FIG. 1b. When the trigger 40 is released, the clamp force is removed and the apparatus can be removed from the workpiece 4 or slid along the workpiece 4 to the required location before being clamped for the next drilling operation to be performed.

The trigger 40 engages with a trigger catch pin 50 which exerts a closing pressure on the lower jaw 30 via the clamping sub assembly 52 when moved along an inclined slot or surface 54. The clamping sub assembly 52 includes the lower jaw 30, plunger 28, adjuster screw 26, adjuster knob 24 and rotates around a pivot pin engaging with holes in the housing 14 to grip the work-piece.

The lower jaw 30 is connected to the plunger 28 and lower jaw assembly 56 with a hard spring separator to take up clamping tolerance and make the lower jaw 30 sit flat on the workpiece surface 38 regardless of the inclination of the lower jaw sub assembly 56 when activated by the trigger 40.

An incremental, disengageable trigger lock 58 can be used which, when engaged, holds the trigger 40 in its engaged position on the griping handle 20, thereby maintaining the grip pressure on the work piece 4 while the pocket hole is drilled. The trigger lock 58 is a manual release for the clamp trigger 40 once the hole is drilled, releasing the grip on the work-piece 4. It can also be disengaged automatically by the returning handle 16 which, with an additional rearward movement, can act to release the trigger lock 58.

The apparatus allows the drill bit 36 to be used without the need for a drill guide and for the drill bit to be provided in the correct position and to form a pocket hole to the correct depth for the particular thickness of the workpiece 4 by advancing the drill bit 36 into the workpiece 4 in the direction of arrow 51. An indicator scale confirms the wood thickness selection to the user.

Driven by, and synchronised with, the adjuster knob 24, is a back stop 42 which variably limits the insertion distance of the workpiece 4 into the recess portion 10 depending on the chosen thickness setting for the workpiece. The back stop 42 is a rotationally pivoted arm driven by the adjustment plunger via a back stop link plate 60.

A drill depth stop 62 is provided which is a rotationally pivoted arm driven by the back stop 42 position so as to limit the drill penetration by placing incremental stops/steps in the path of the drive assembly 64 which moves the motor assembly 44 in the direction of arrow 66.

In order to operate the apparatus once the workpiece 4 is clamped in position, the handle 16 is moved by the user so as to slide the same away from the user in the direction 48 and this relative movement of the handle 16 with respect to the housing 14, causes movement of the toothed sprocket wheels 68 of the drive assembly which are rotationally mounted to the inside of the housing 14, to cause operation of the drive assembly 64 by engagement with one or more first toothed tracks 70 provided on the handle 16 and one or more second toothed tracks 72 provided on the motor assembly 44. The second tracks 72 are parallel or at an angle to the first tracks 70 and connected in such a way that when the handle 16 is pushed away from the user in direction 48, the motor assembly 44 advances in a second direction as indicated by arrow 66. The first and second directions are different and may be angularly offset as indicated in FIGS. 1-5b or parallel but opposing as indicated in the embodiments of FIGS. 6a and b. This allows the clamping sub assembly to maintain the apparatus in position on the edge of the workpiece 4 until the pocket hole is drilled in the direction of arrow 51 and the drill bit 36 is then subsequently withdrawn by moving the handle 16 in the reverse direction of arrow 53.

Typically the drive spindle 74 of the motor assembly will be rotated faster than that for a conventional drill and so allow the drill bit 36 to be rotated relatively quickly in order to obtain a faster, cleaner cut pocket hole. The motor assembly 44 advances on sliders, rollers or ball-bearings, similar to a plunge router mechanism, and is driven by the toothed sprocket wheels 68 to drive the unsupported pocket hole drill bit 36 into the work-piece.

In FIGS. 1a-5b the motor assembly 44 and drill bit 36 are mounted on a common axis such that the drill bit is at the end of the motor assembly 44 whilst in FIGS. 6a and b the motor assembly 44 is provided alongside the drill bit and the movement of the same is provided by a toothed belt drive 76, so that the cutter is facing in the opposite direction to the motor output shaft, thus reducing the overall length of the housing 14.

In either case the spindle 74 to which the drill bit is attached is supported on bearings for minimum axial deflection. Typically the drill bit is mounted to the apparatus by means of a rigid connecting collet like those used to hold un-supported router cutters in routing machines.

Figure 7:
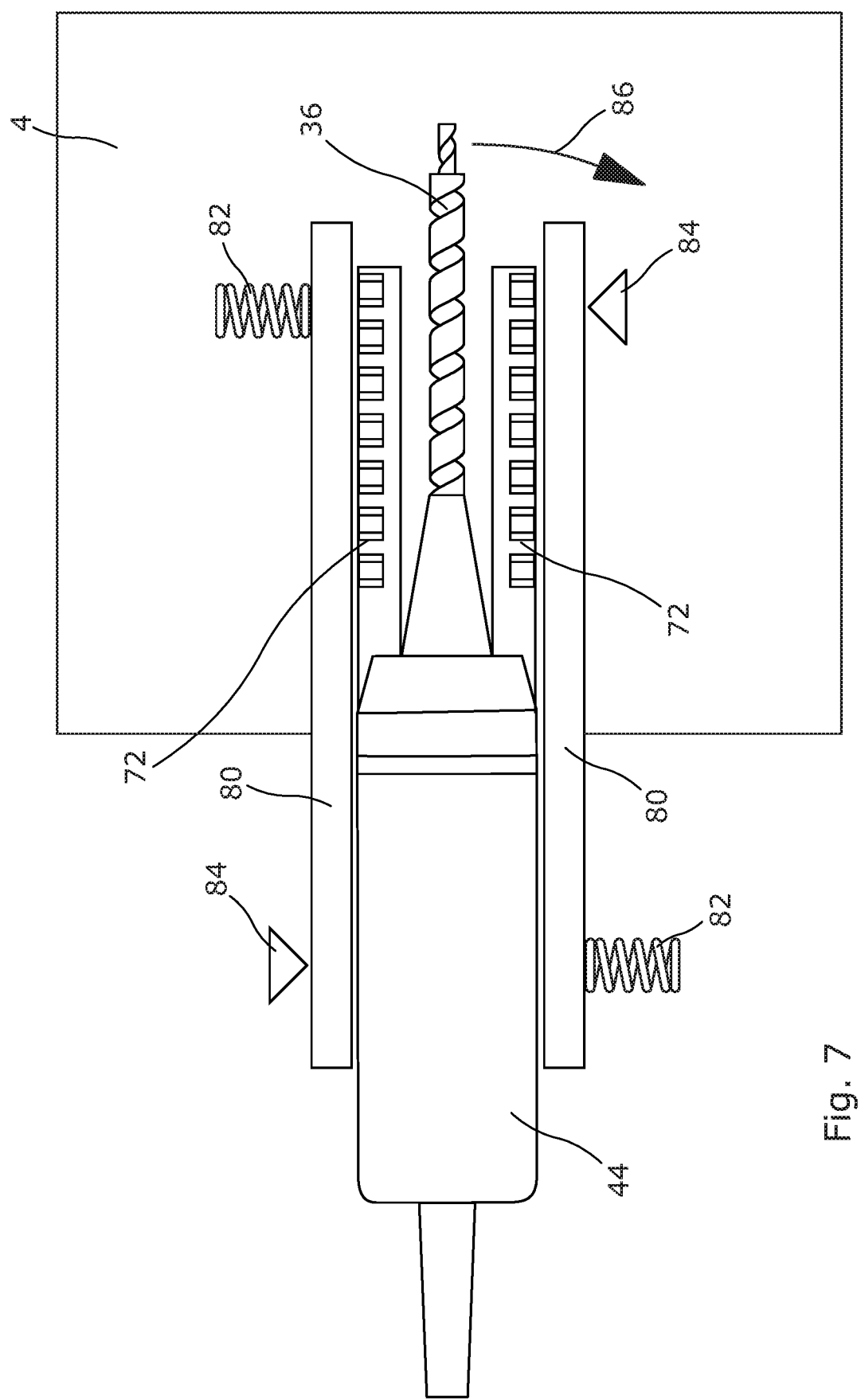
FIG. 7 illustrates schematically the drive mechanism in accordance with one embodiment of the invention.
Figure 9B:
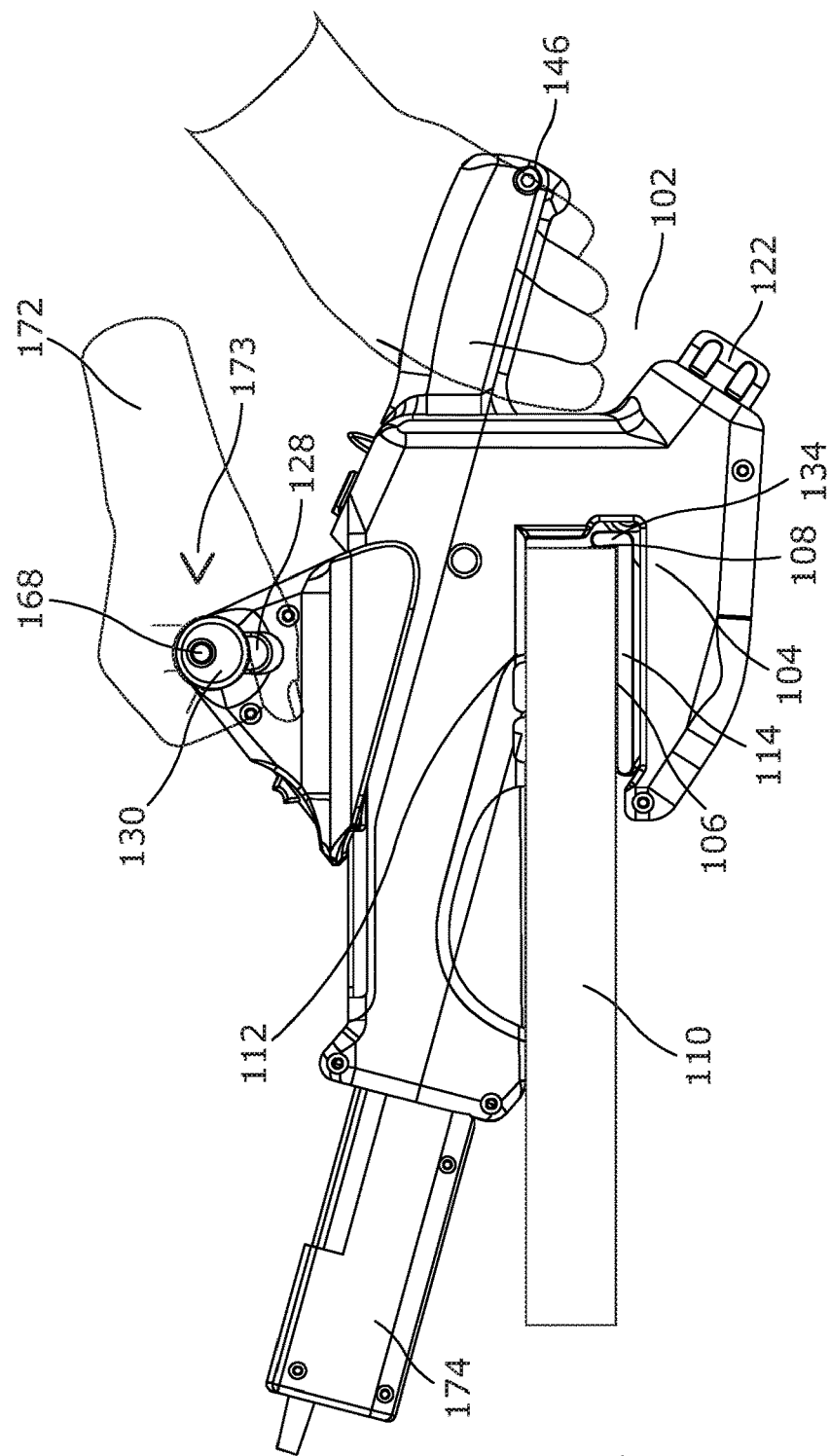
Figure 9A:
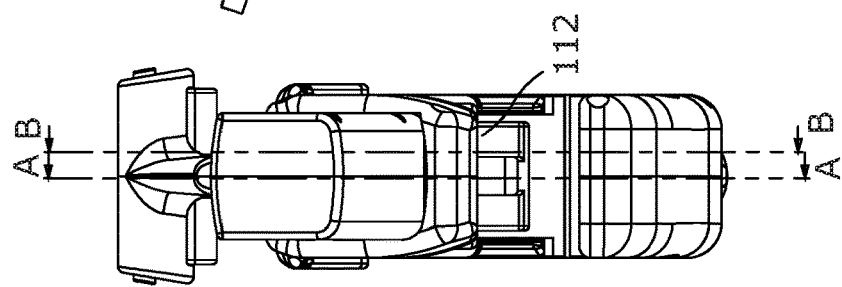
Figure 10A:
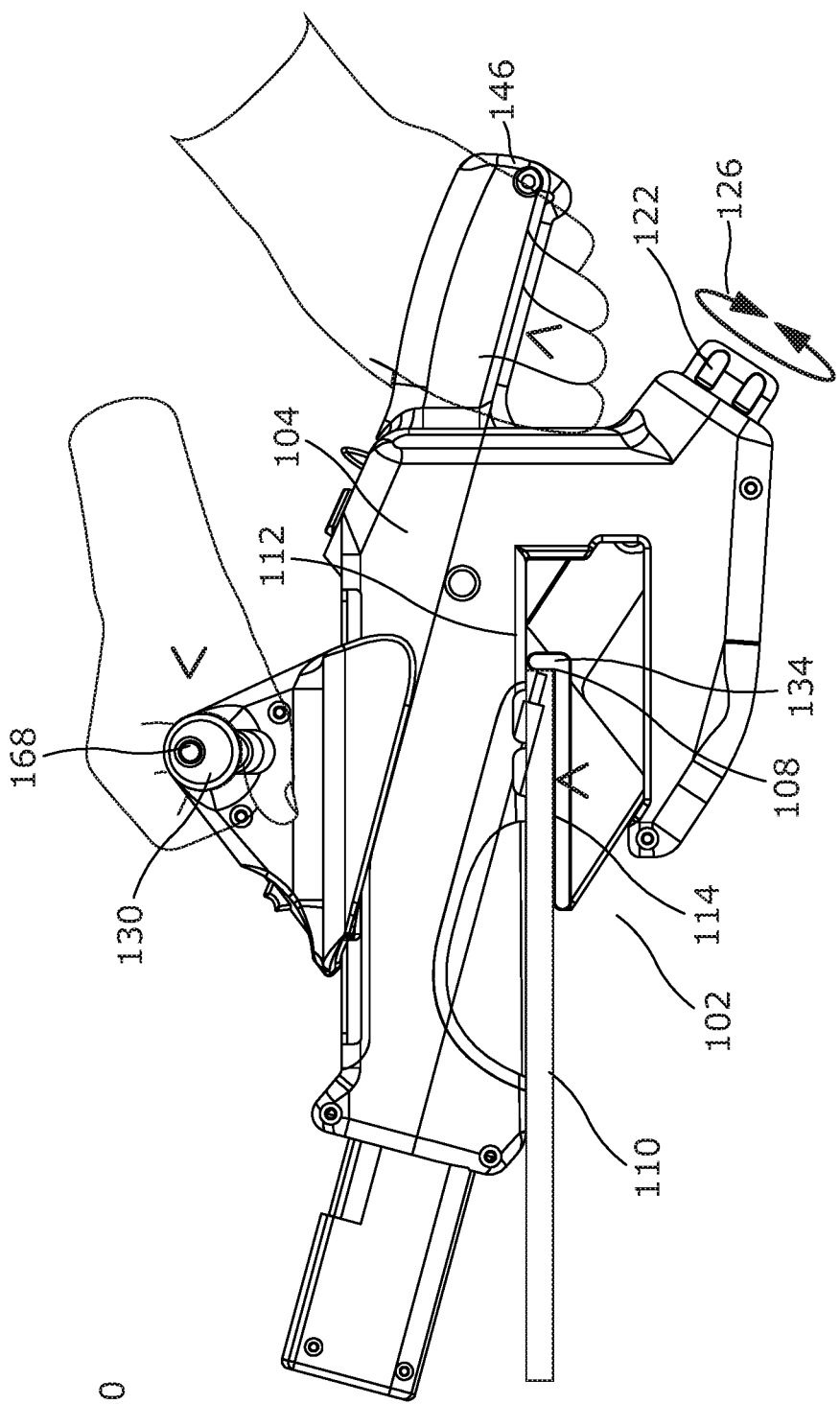
Figure 10B:
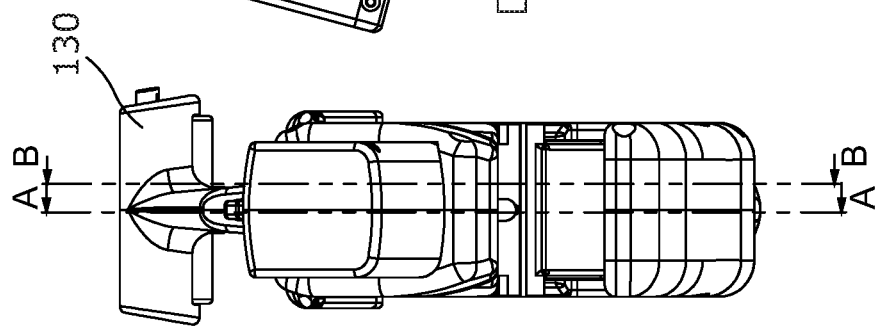
Figures 11A, 11B:
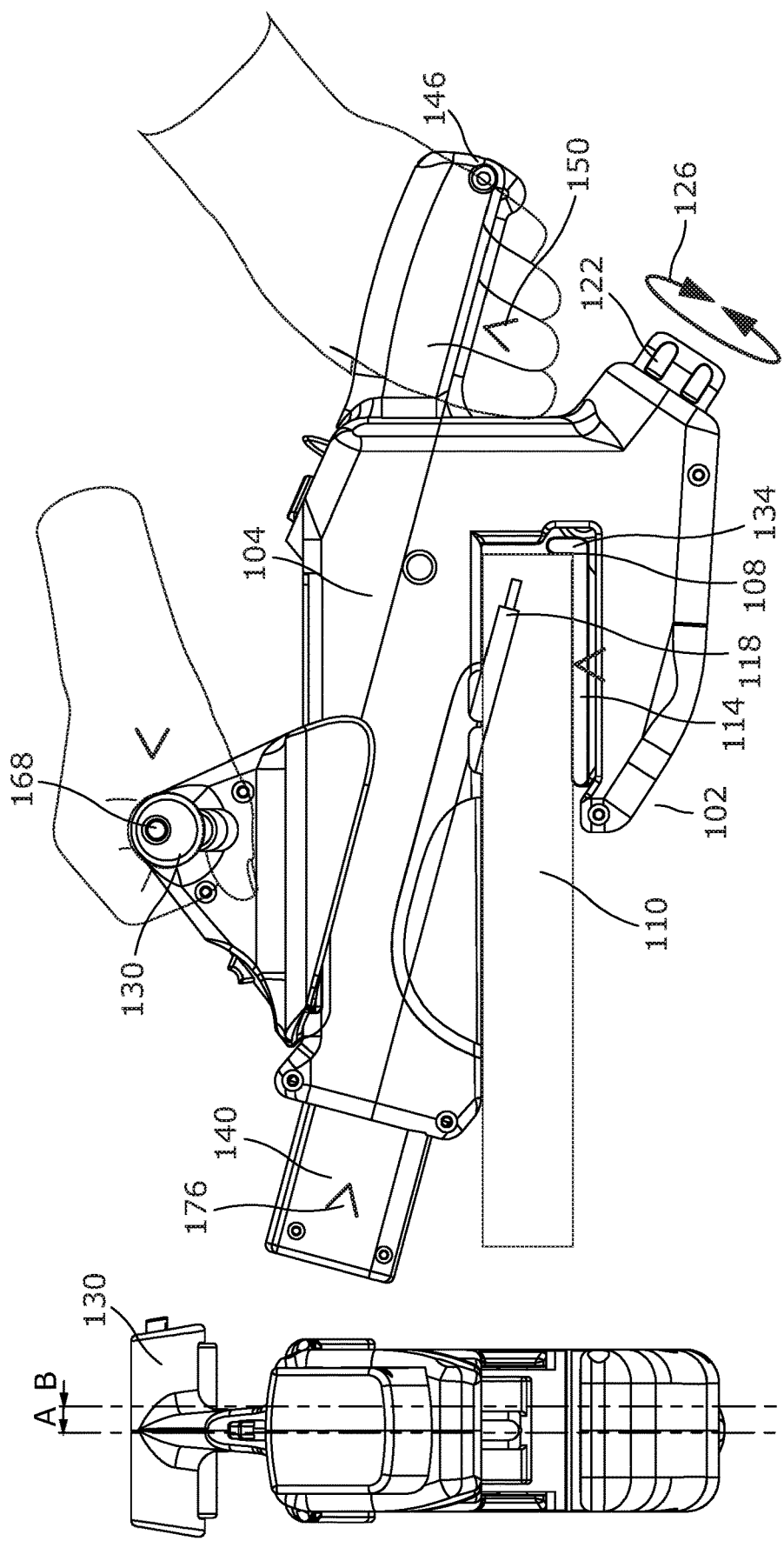
Figure 13:
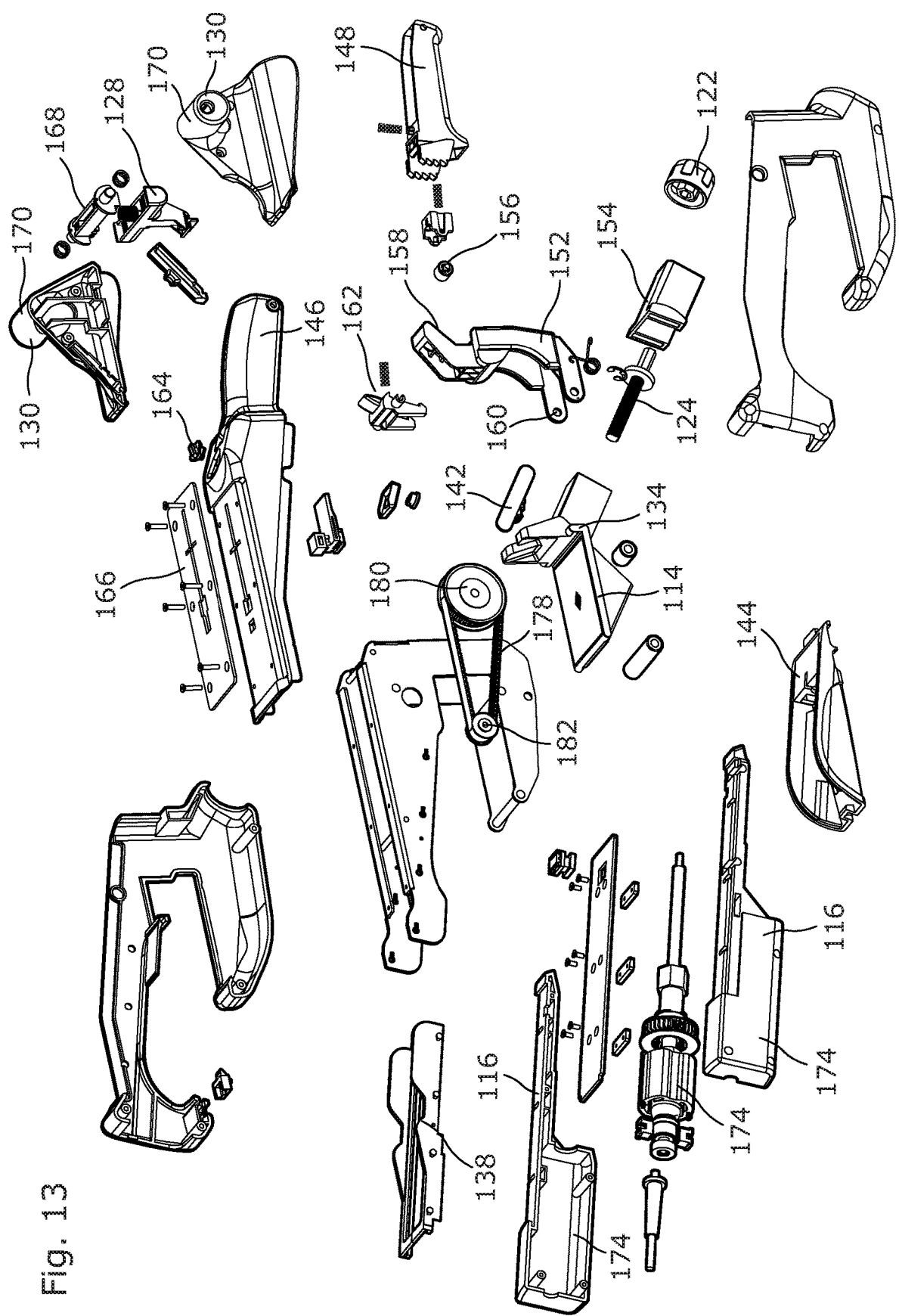
FIG. 13 is an exploded diagram of the components of the apparatus in accordance with the first embodiment of the invention in detail.

With reference to FIG. 7 a support mechanism is illustrated in the form of track supports 80 in the form of rails which are biased by springs 82 and fixed supports 84 to the substantially parallel position. Thus, when the drill bit 36 is approaching the workpiece 4 at 15 degrees the drill bit would normally seek to twist the motor assembly 44 on the tracks 72 in the direction of the arrow 86. However in accordance with the invention this movement is resisted by the rigid support of the rails 80 and to maintain the rails position the fixed supports are opposed by the springs 82 and as there is no force from the drilling operation of the apparatus to act against the springs 82, this allows the drill to run without sidewall vibration of the apparatus in use.

Referring now to FIGS. 8a to 13 there is illustrated a further embodiment of apparatus 102 in accordance with the invention. The apparatus 102 includes a body 104 which defines a slot 106 for the receipt therein of an edge 108 of a workpiece 110 which can be of variable thickness within a thickness range to suit the particular requirements at the instant of use of the apparatus. In FIGS. 9a-e and 11a-d the workpiece is shown with a first thickness and in FIGS. 10a-d the workpiece which is in position is shown to have a second, reduced, thickness.

Clamping means are provided to retain the workpiece 110 in position and these include a first jaw 112 which contacts the upper surface of the workpiece 110 and a lower, movable jaw 114 which contacts the opposing, lower surface of the workpiece 110. A comparison between the position of the movable jaw 114 in FIG. 9b when it is in use to clamp a thicker workpiece 110 and the position in FIG. 10a will show the manner in which the position of the movable jaw 114 can be adjusted.

The body 104 is provided to be hand held and the workpiece, when clamped in position is provided for a hole to be drilled into the same via a drill bit 118 which is held in position by holding means 116 provided as part of the apparatus.

The movable jaw 114 is therefore moved into contact with the surface of the workpiece which is also contact with the jaw 112 in preparation for the workpiece 110 to be clamped in position. Adjustment means 120 in the form of a rotational adjustment knob 122 drives a threaded adjuster screw 124 hence moving the plunger/lower jaw 114 to contact the workpiece surface.

The adjustment via the rotation of the adjuster knob 122 as indicated by arrow 126 only closes the gap between the lower jaw 114 and the workpiece 110. The clamping force is applied via the operation of a trigger assembly which includes a user actuable trigger 148 provided on the handle assembly 130. Subsequent release of the trigger 148, manually or automatically, releases the clamping force on the work-piece 110 so that it can be moved and re-clamped by again squeezing the trigger 148, for the formation of the next hole in the same or another workpiece 110.

The movable jaw 114 is driven up an inclined surface 132 by turning the adjuster knob 122 such that the moving lower jaw 114 with its back-stop 134 automatically controls the insertion distance of the workpiece 110 into the slot in the direction of arrow 136 tool depending on the thickness setting for the clamping of that workpiece 110.

The drill bit 118 penetration distance into the workpiece 110 is controlled by a feature of the movable jaw 114 which variably blocks the extent of possible advancement of the holding means 116 (and hence drill bit 118) linearly along sled guide rails 138 towards the workpiece 110 as indicated by arrow 140. Thus, the drill bit depth of penetration into the workpiece, the thickness of the workpiece 110 and position are thus synchronised to give the optimum hole formation for the work-piece 110. An indicator scale 142 attached to the movable jaw 14 and visible through a window 144 in the body 104 indicates the thickness of the workpiece with which the apparatus is engaged.

To one end of the body there is provided a fixed handle 146 with the pivotally movable clamp trigger 48 as indicated by arrow 150 which exerts a holding grip on the workpiece through the clamp lever 152, clamp cradle 154 and movable jaw 114. The clamp trigger 148 is rotationally mounted to the end of the fixed handle 146, engaging, via sprung roller 156 an inclined ramp 1158 on the upper part of the clamping lever 152 at its free moving end. The clamping lever 152, in rotating forward about pivot axis 160 exerts closing pressure on the yoke and hence movable jaw 114 with sufficient force to clamp the workpiece 110 in position, ready for drilling. The sprung roller 156 in the trigger 148 acts to limit the force with which the work-piece 1110 can be clamped, hence protecting the workpiece 110. An incremental, disengageable trigger lock 162 holds the clamp trigger 148 in its engaged position, thereby maintaining the grip pressure on the work piece 110 while the pocket hole is drilled.

The trigger lock 162 is a manual release for the clamp trigger 148 and hence releases the clamping force on the work-piece 110 once the hole is drilled. A cam switch 164 can also be set to disengage the trigger lock automatically by allowing the returning slide handle assembly 130 to release the trigger lock 162.

The slide handle assembly 130 mounted on slide guiding plate 166 attached to the body 102 acts to advance the drill bit 118 into the workpiece and the handle assembly is typically biased towards a position in which the drill bit is withdrawn as illustrated, for example, in FIGS. 8a-i.

A user operable button 168 on each end of the slide handle grip 170 of the handle assembly 130 allows the top trigger 128 to rise, freeing the handle assembly 130 to be slid by the user gripping the same with their hand 172 and slidingly moving the handle assembly 130 as indicated by arrow 173 to move along the guide plate 166. This, in turn causes the holding means 116 which includes the drill bit 118 and a motor assembly 174 to move the in the direction 176, thus advancing the same towards the workpiece 110 and the movement of the holding means 116 is driven by the toothed belt 178 which connects the handle assembly 130 thereto. Pushing the slide handle assembly 130 in the direction of arrow 173 therefore advances the toothed belt 178 attached at one point to the underside of the slide handle assembly 130, around two toothed sprocket wheels 180, 182 which are rotationally mounted between the side plates 184,186 and therefore cause movement of the connected holding means 116 in direction 176. This arrangement ensures that the forces applied act to keep the apparatus 102 in position on the edge of the workpiece 110 until the hole is drilled by the rotating drill bit 118 entering into the workpiece 110.

In one embodiment the drive spindle and drill bit 118 will rotate at the speed of a router (in the range of 10,000 to 30,000 rpm) to achieve a faster, cleaner cut. In one embodiment the drive and drill bit 118 are mounted on the end of the motor as a router-like direct drive and the spindle to which the drill bit is attached is supported on bearings for minimum axial deflection. Preferably the drill bit 118 is mounted to the motor drive by means of a rigid connecting collet like those used to hold un-supported router cutters in routing machines.

A further embodiment of the invention is described with reference to FIGS. 14a-18b. In this embodiment there is provided apparatus 202 for drilling a hole in a workpiece 204 applied to the edge of a piece of wood between 12 mm and 50 mm thick, and clamping means 206. The body 208 of the apparatus is provided to be hand held and the clamping means define a slot 210 to accept the portion 212 of the work piece 204 in which the pocket hole is required to be drilled.

Below the lower clamp jaw 214 is a rotational adjustment knob 216 which, when turned, moves by way of a threaded adjuster screw 218, the movable lower clamp jaw 214 to bring the same into contact with a surface of the workpiece 204. This adjustment closes any gap between the lower jaw 214 and the workpiece 204 and the clamping action is performed by operation of a trigger 220 mounted in the fixed handle 222 provided as part of the body 224. The clamp trigger 220 is rotationally mounted to the end of the fixed handle 222, engaging the clamping sub-assembly by way of a trigger catch pin 236 which exerts closing pressure on the lower jaw 214 through the clamping sub-assembly when moved along an inclined slot or surface. The clamping sub-assembly comprising the lower jaw, plunger, adjuster screw, knob and lower clamp rotates around a pivot pin engaging with holes in the side plates, to grip the workpiece.

Driven by, and synchronised with, the adjuster knob 216 is a back-stop 226 which variably limits the insertion distance of the workpiece depending on the workpiece thickness. The back-stop 226 is rotationally pivoted and driven by the adjustment plunger via the back-stop link plate 228. The drill bit depth stop 230 is a rotationally pivoted arm driven by the back stop 226 to limit the drill bit penetration into the workpiece 204 by placing incremental stops/steps 232 in the path of the holding means 234 for the motor and drill bit assembly.

An incremental, disengage-able trigger lock 238 holds the clamp trigger 220 in its engaged position, thereby maintaining the grip pressure on the work piece while the pocket hole is drilled.

The trigger lock 238 can be disengaged automatically by the returning slide handle assembly 240 which with a small additional rearward movement can act to release the trigger lock 238. The slide handle assembly 240 is mounted on the top surface of the body of the apparatus and movement of the same in the direction of arrow 242 by the users hand 244 acts to advance the drill bit 246 into the wood, withdrawing spring-assisted once the hole is cut. By pushing the slide handle assembly 240 in the direction of arrow 242, a connected toothed track 248 attached to the underside of the slide handle assembly 240 is advanced over a rotating toothed sprocket wheel 250 rotationally mounted on the body.

Figure 14A:
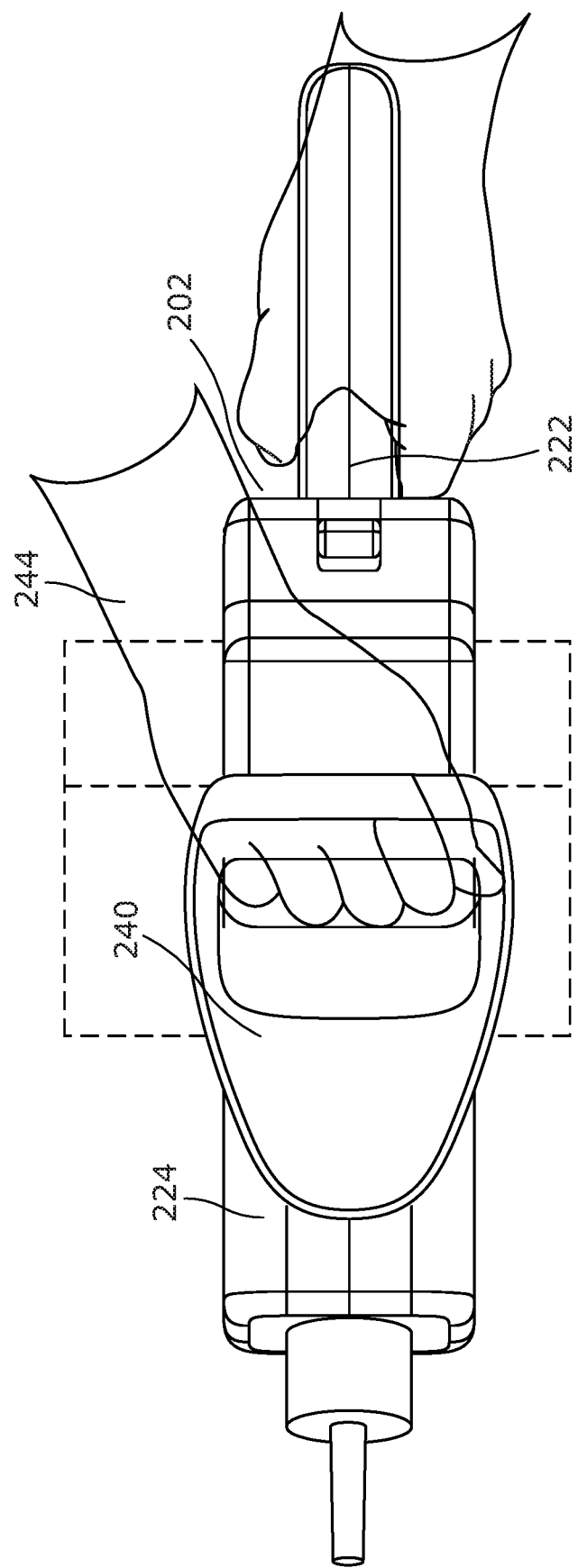
FIGS. 14a-b illustrate perspective views of use of apparatus in accordance with a second embodiment of the invention.
Figure 14B:
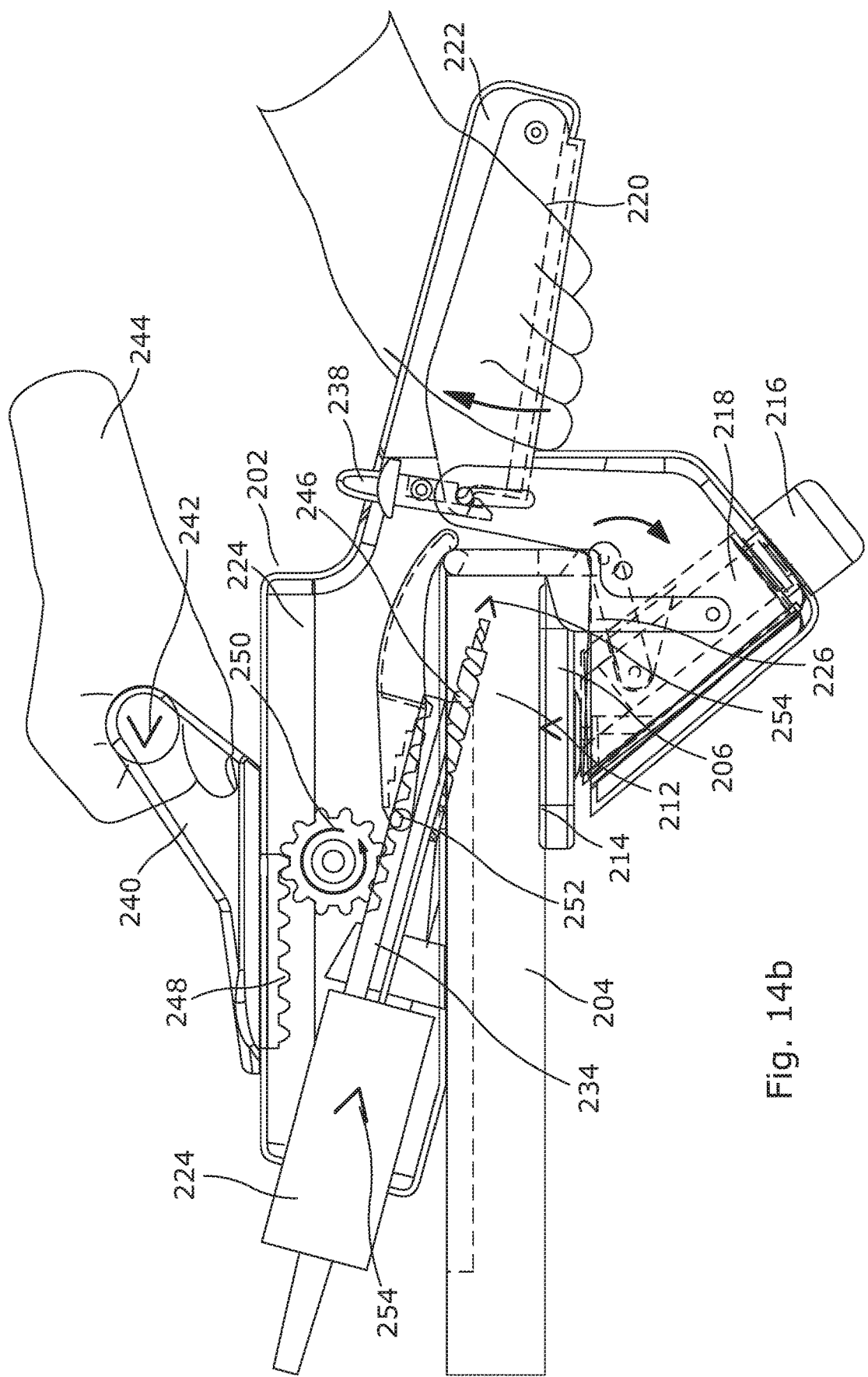
Figure 15A:
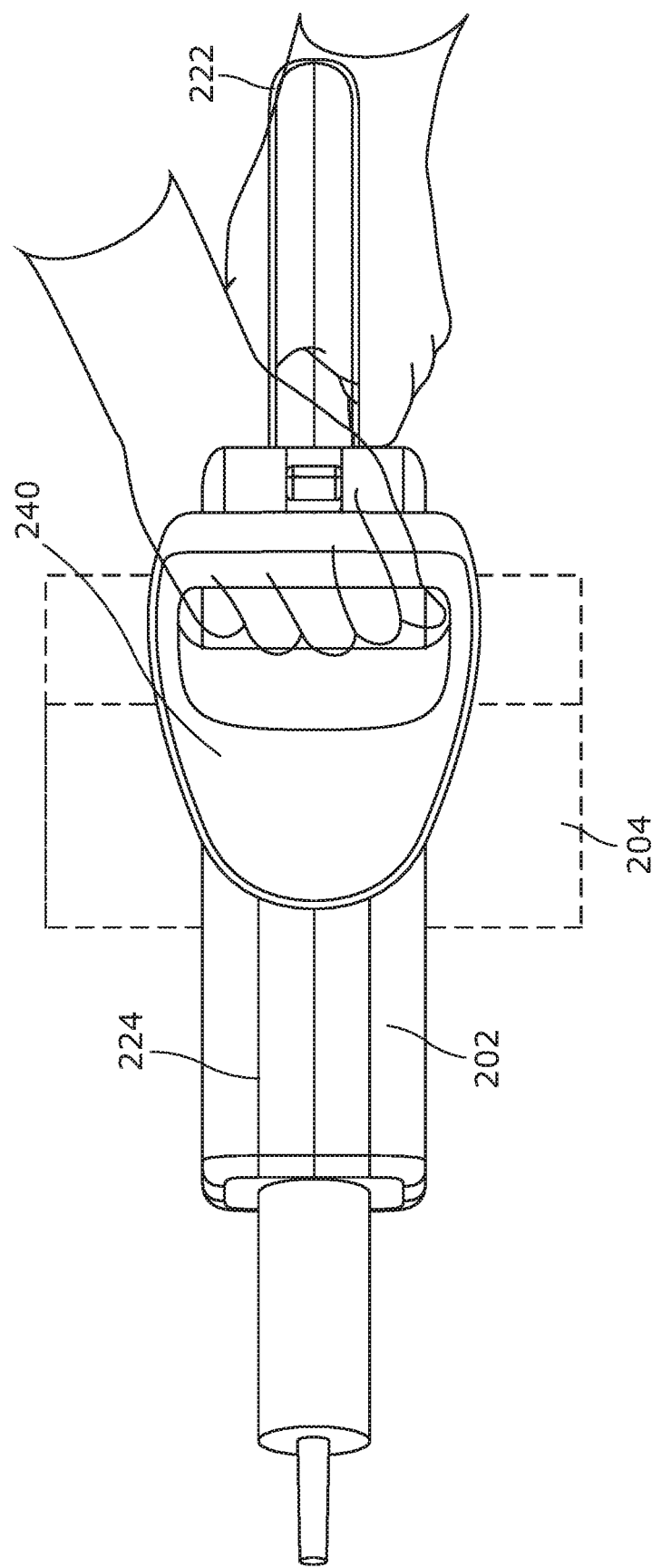
Figure 16:
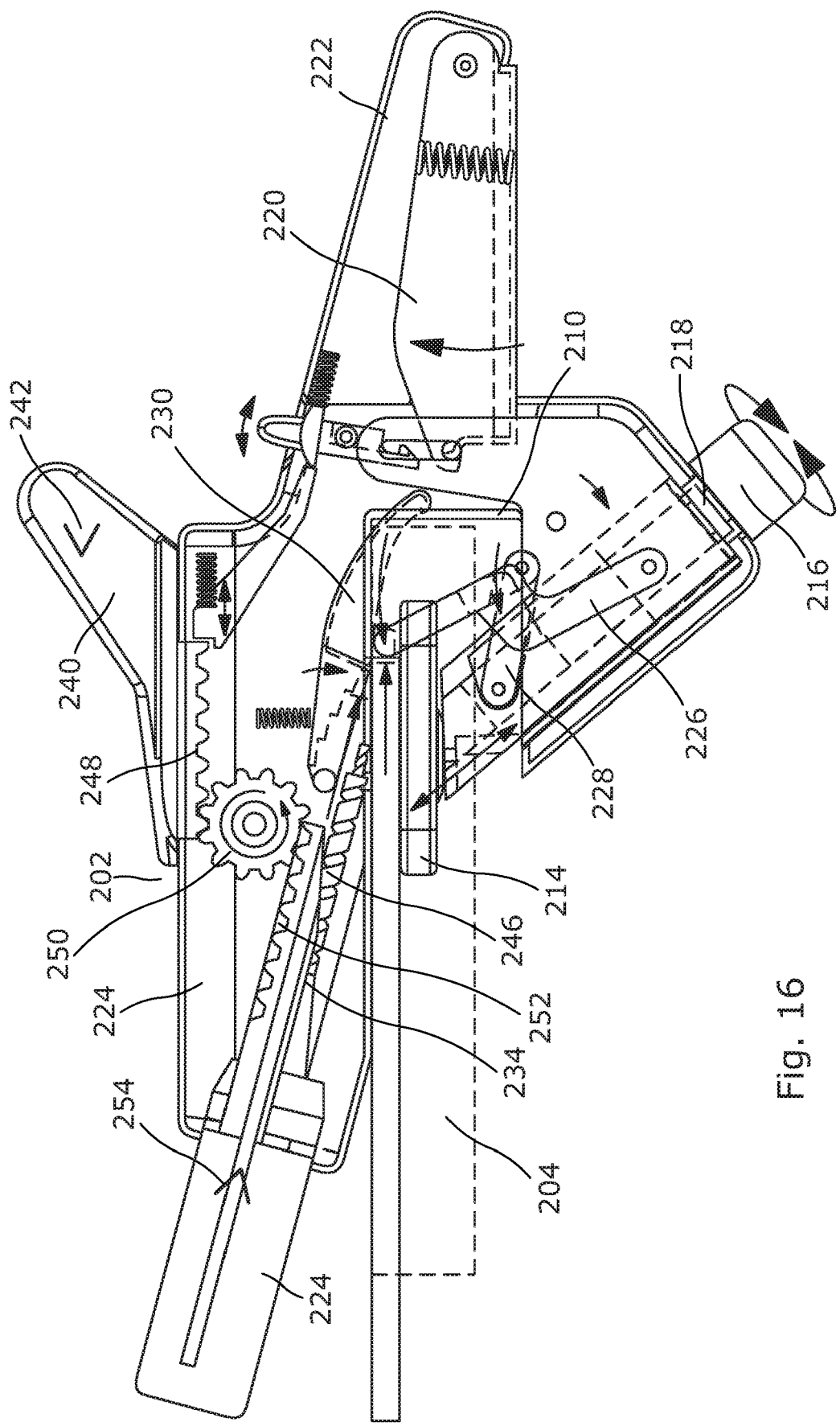
FIG. 16 illustrates an elevation of the apparatus showing internal components in accordance with the second embodiment of the invention.
Figure 17:
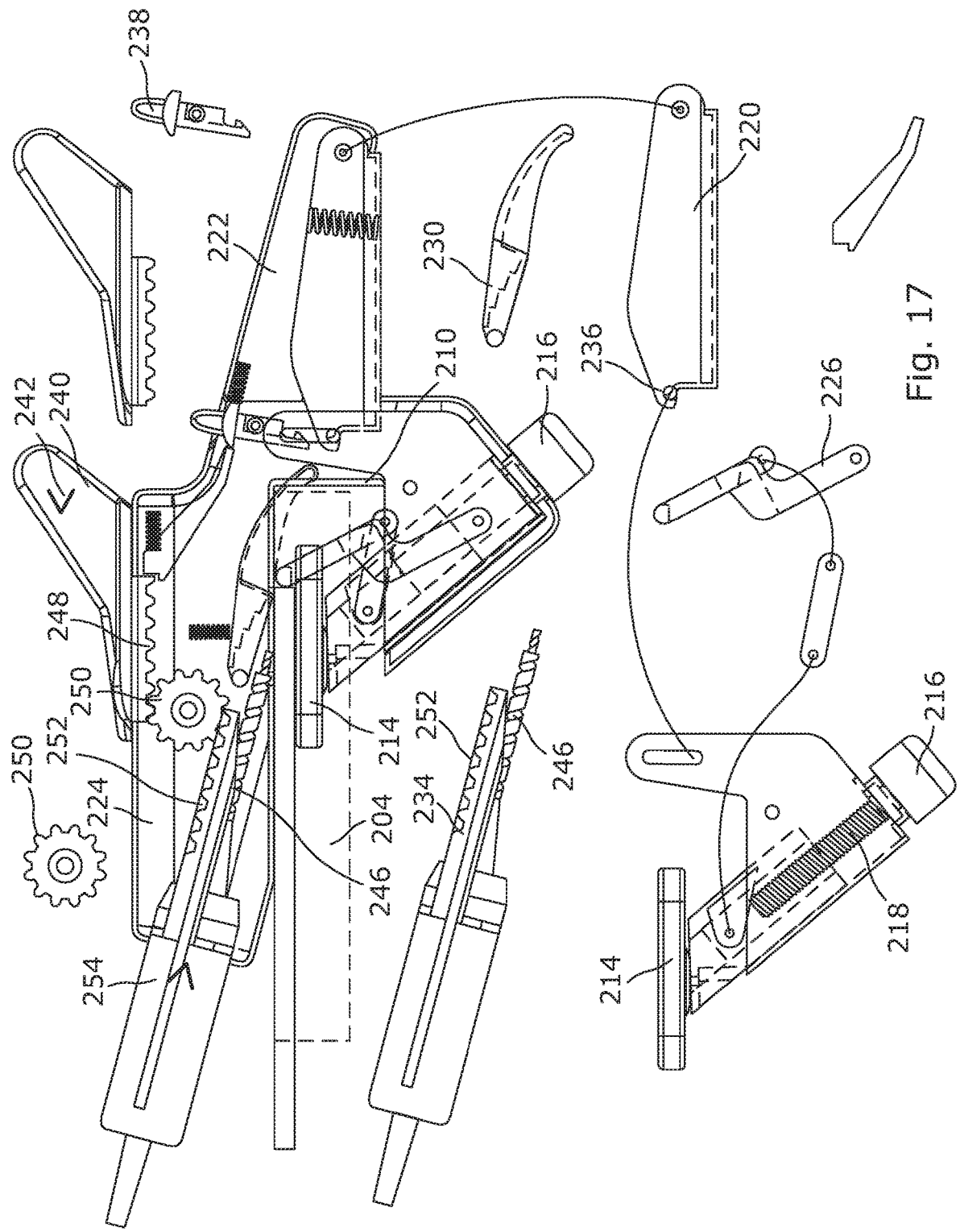
FIG. 17 is an exploded diagram of the components of the apparatus in accordance with the second embodiment of the invention in detail.
Figures 18A, 18B:
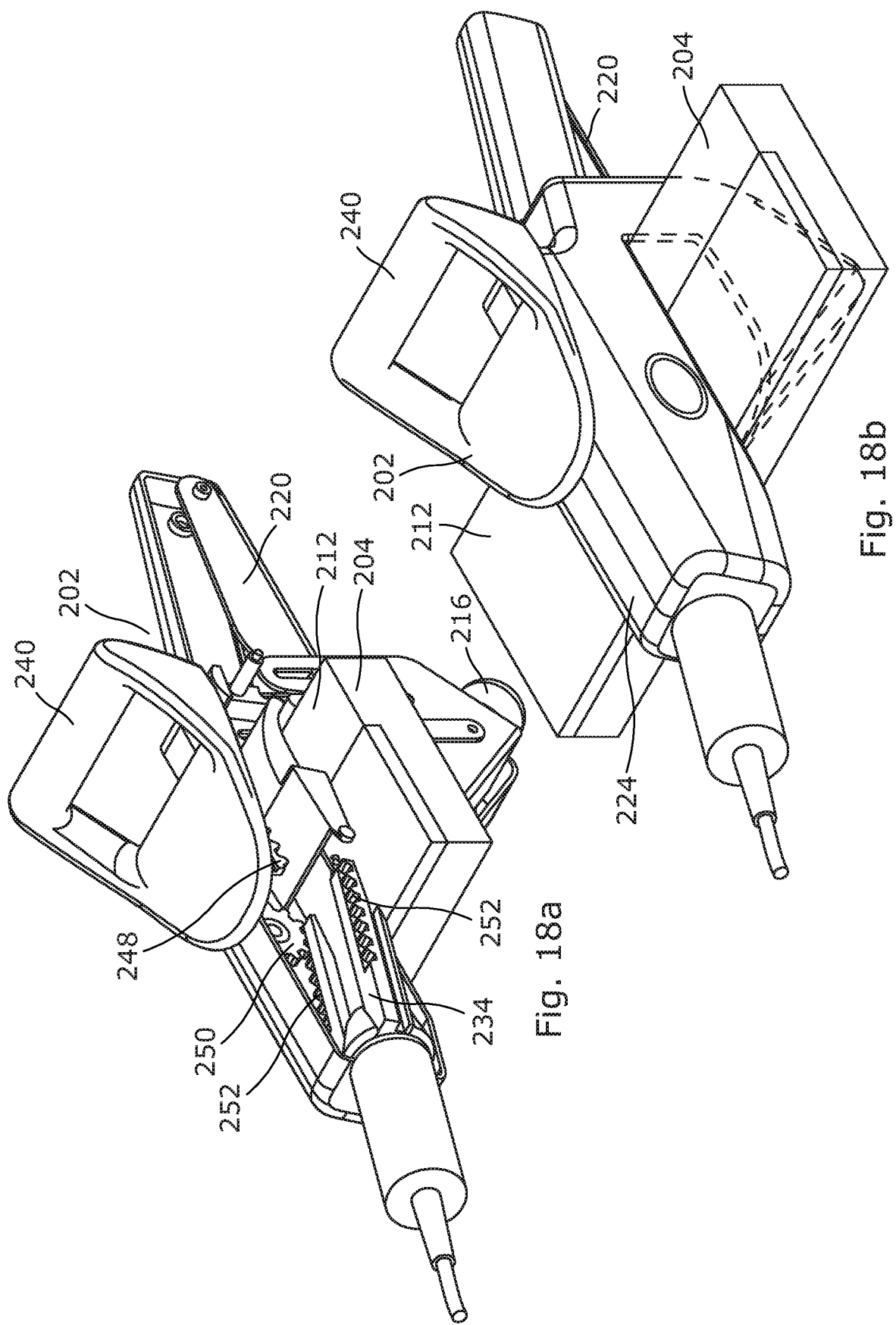
FIGS. 18a-b illustrate perspective views of the apparatus in accordance with the second embodiment of the invention.

On the opposite side of the toothed sprocket wheel is a second toothed track 252, parallel or at an angle to the first track 248 and connected to the holding means assembly 224 in such a way that when the slide handle assembly 240 is moved, the holding means assembly 224 advances in the direction indicated by arrow 254 and so advances the drill bit 246 into the workpiece 204 to the required depth as indicated in FIG. 14b.

In FIG. 19a-b there is illustrated a further variation of the invention and in this embodiment the motor 256 is mounted above the drill bit 246 and is connected to the same via a drive belt 258. This arrangement allows the overall length of the apparatus to be reduced in comparison to the previous embodiments.

Figure 20:
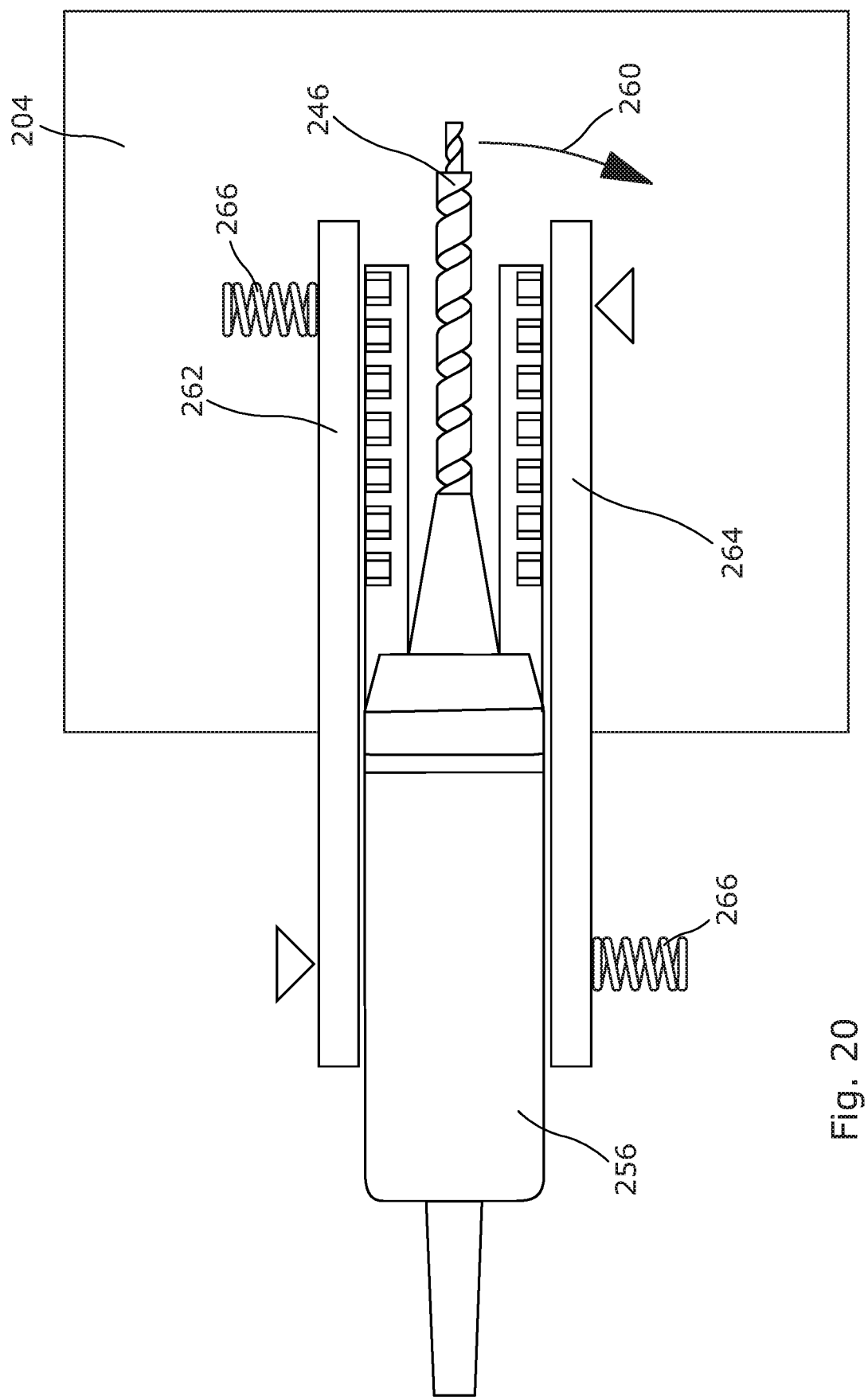

FIG. 20 illustrates the manner in which the forces applied to the drill bit in either embodiment will cause the same to try and twist the motor assembly 256 as indicated by arrow 260 and how, to overcome this, guide rails 262, 264 are provided and the forces are opposed by springs 266 and as there is no force from the drilling operation to act against the springs 266 this keeps the drill running true without sideways vibration occurring.

Figure 21A:
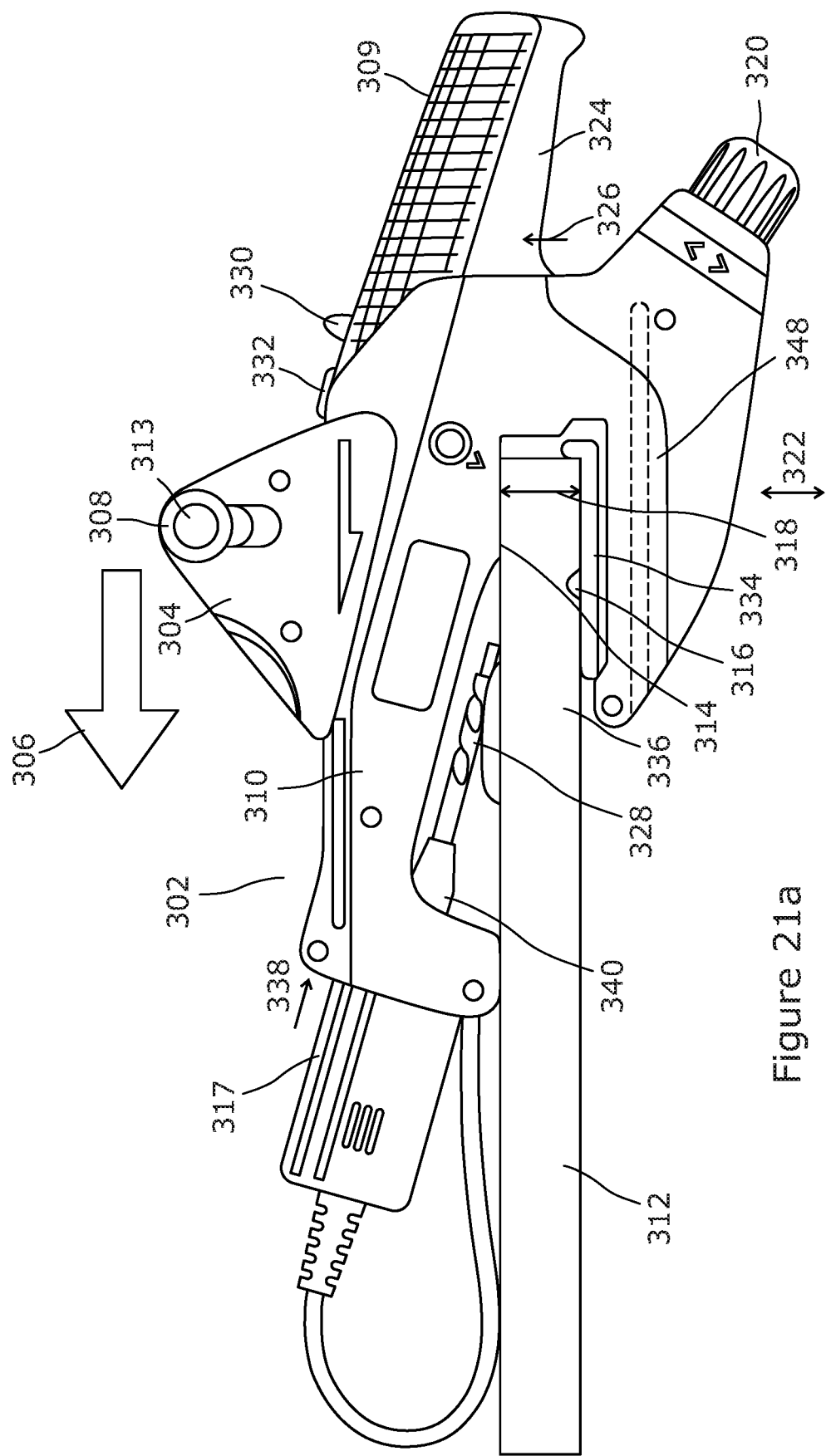
FIGS. 21a and b illustrate a further embodiment of apparatus in accordance with the invention.
Figure 21B:
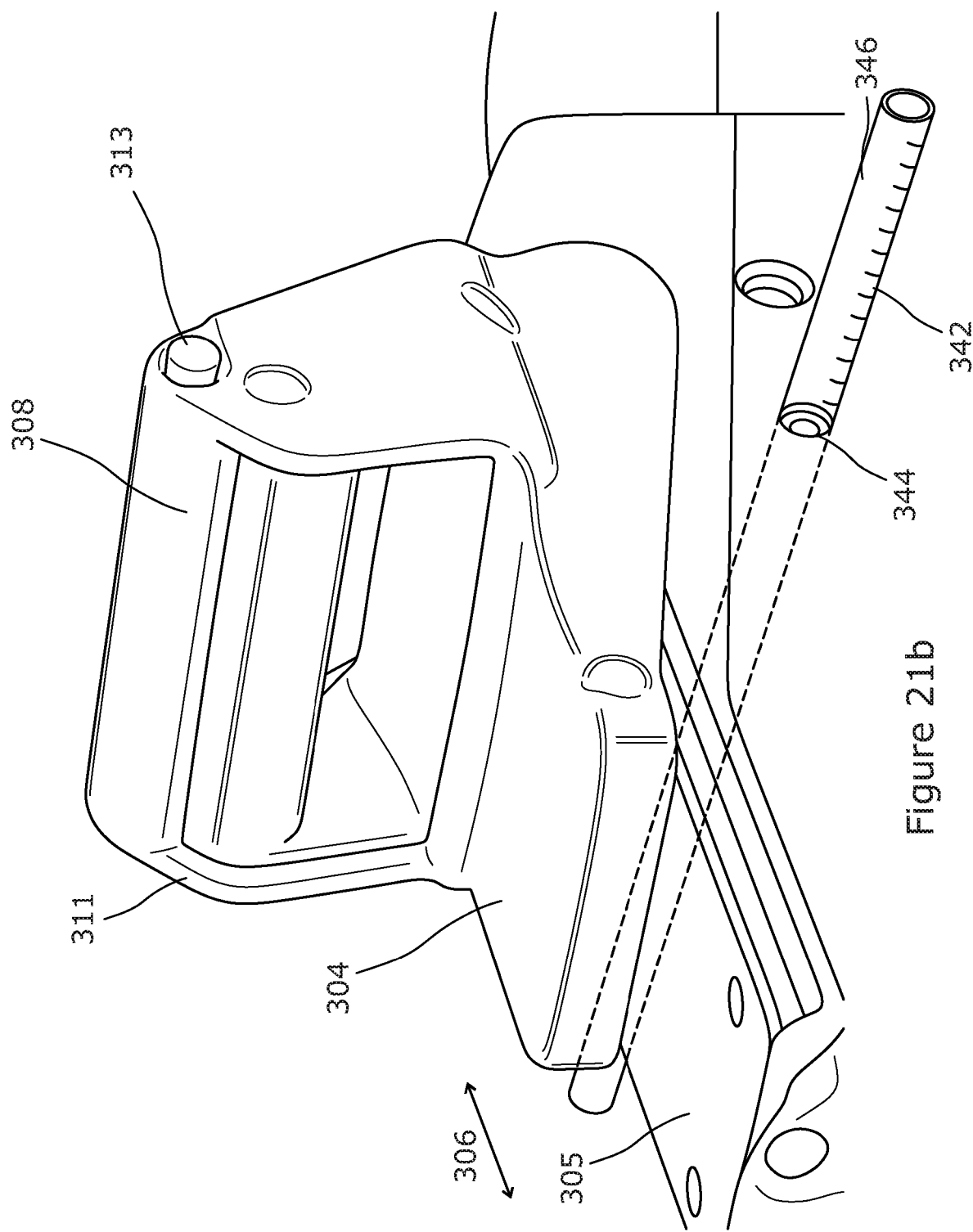

FIGS. 21a and b illustrate a further embodiment of apparatus 302 in accordance with the invention and it will be appreciated that this embodiment can include some or all of the components described with reference to the preceding embodiments. The apparatus again includes a first part 304 which is slidingly moveable along a track 305 in the direction of arrow 306 by a user gripping the handle 308 of the first part. At the same time the user grips, with their other hand, the handle portion 309 so as to allow the relative movement of the movable part 304 with respect to the second part 310 of the apparatus. The handle has a portion 311 which is pivotably movable and there is provided a switch 313 so that when both are moved by the user, the part 304 can be slidingly moved and a mechanical linkage is connected to control means for the motor 317 which drives the drill bit 328 to ensure that the motor is switched on and the drill is rotating before the same enters the workpiece 312. The movement translation means allow the movement of the part 304 in the direction of arrow 306 to be translated into the movement of the drill bit holder assembly, including the drill bit 328 and motor 317, in the direction 338. The movement translation means is located in the second part 310 and includes a belt and pulley system, with the belt having teeth such that movement of the part 304 causes the teeth of the belt to engage with sprocket pulley wheels connected to the drill bit holder assembly 340 and so cause the motor and drill bit to be moved towards and the drill bit moved into the workpiece to form the hole.

The workpiece 312 in which the hole is to be formed is clamped in position by opposing clamping means plates or jaws 314, 316, with the plate 316 being movable towards and away from the opposing plate 314 in order to alter the spacing 318 between the same and hence define a range of possible thicknesses of workpiece which can be clamped in position between the plates 314, 316. Adjustment of the position of the plate 316 is achieved by the user rotatable knob 320 which as previously discussed acts on a threaded shaft inside the housing of the apparatus and which is connected to the plate 316 to adjust the position of the same in the direction of arrow 322. Furthermore the clamping means adjustment can be further controlled by the user gripping portion 324 of the handle 309 in the direction of arrow 326 to further move the clamp plate 316 towards the adjacent workpiece surface and hence further clamp the same in position. This typically allows "fine tuning" of the clamping plate 316 position.

Furthermore the location of the clamping plate 316 with respect to the plate 314 indicates the thickness of the workpiece in which the hole is to be drilled and a mechanical linkage is provided within the housing which controls the depth by which the drill bit 328 is advanced into the workpiece. Thus the depth of hole which is formed is adjustable and directly linked to the thickness of the workpiece which is clamped in position at that time.

The clamping means plate 316 can be released from a clamping position by the user actuation of a clamp lever 330 and/or alternatively when the part 304 is returned to an at rest position after a drilling operating this actuates an auto unclamp switch 332 which releases the clamping force on the workpiece by moving the plate 316 away from the same.

The plate 316 may also include guide means 334 located thereon, one of which is shown in an in use position in FIG. 21a. The provision of the guide means allows an edge 336 of the workpiece to be abutted against the same so that the user can then define and be certain that the hole which is drilled into the workpiece will be at a set distance from that edge. The guide means are typically biased to the extend position shown in FIG. 21a by a spring in the plate and can be moved to a retracted position in which the same lies flush with the plate face so that the workpiece can be placed across the plate surface. Further measurement means can be provided for use and in one embodiment these are in the form of an elongate member 342 which in use is inserted into a port 344 which extends at least partially across the housing of the apparatus. A portion 346 of the elongate member protrudes outwardly from the housing and has measuring markers located therealong (metric and/or imperial) which allow the edge 336 of the workpiece to be matched with a marker and thereby determine the location of the hole which is to be formed in the workpiece by the distance from the edge of the workpiece. In one embodiment, when the elongate member 342 is not in use it may be stored in a channel 348 in the housing as illustrated in broken lines in FIG. 21a.

Figure 22A:
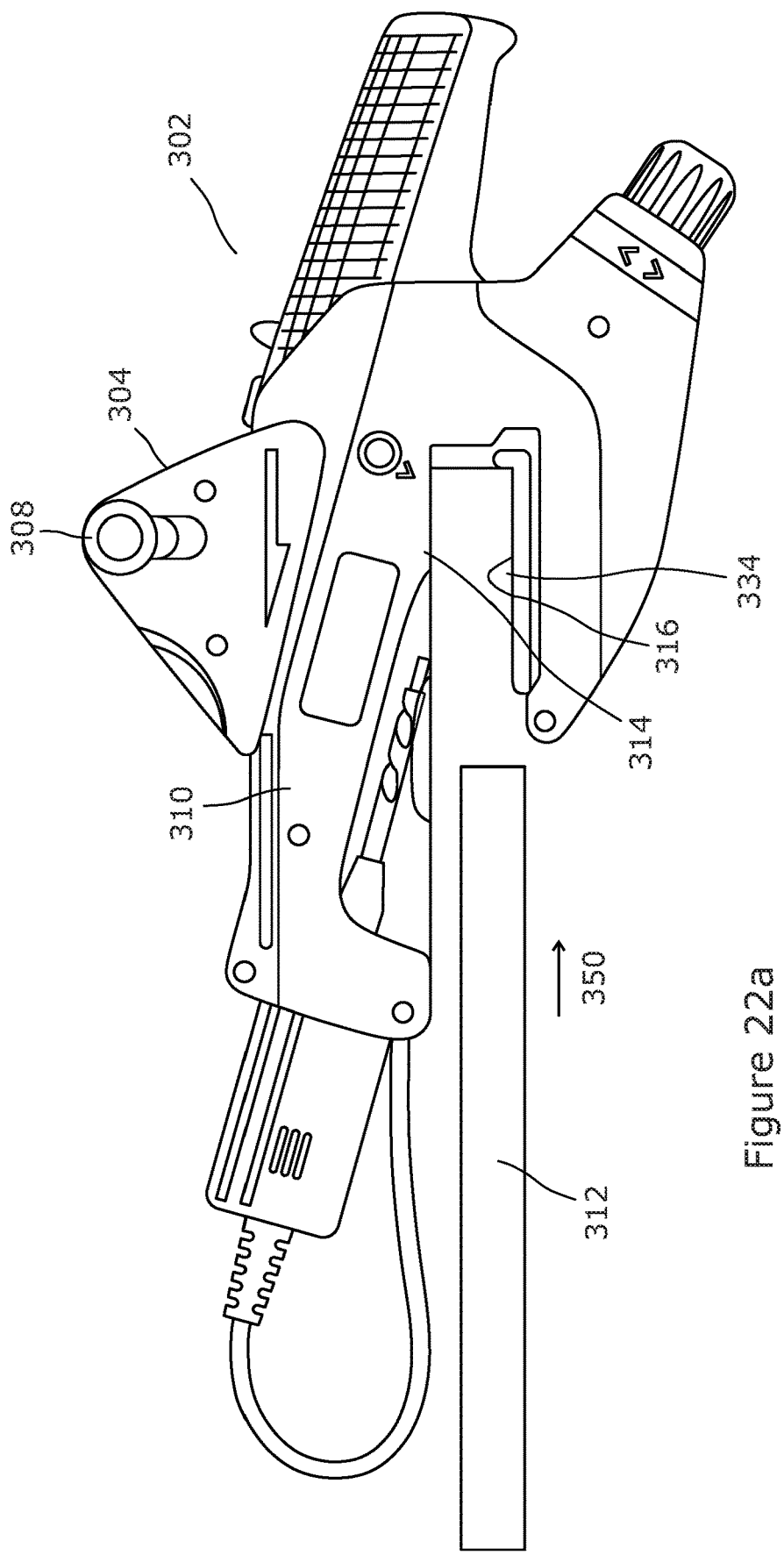
FIGS. 22a-g illustrate a method of use of the apparatus of FIG. 21 to form a hole in a workpiece in accordance with the invention.
Figure 22B:
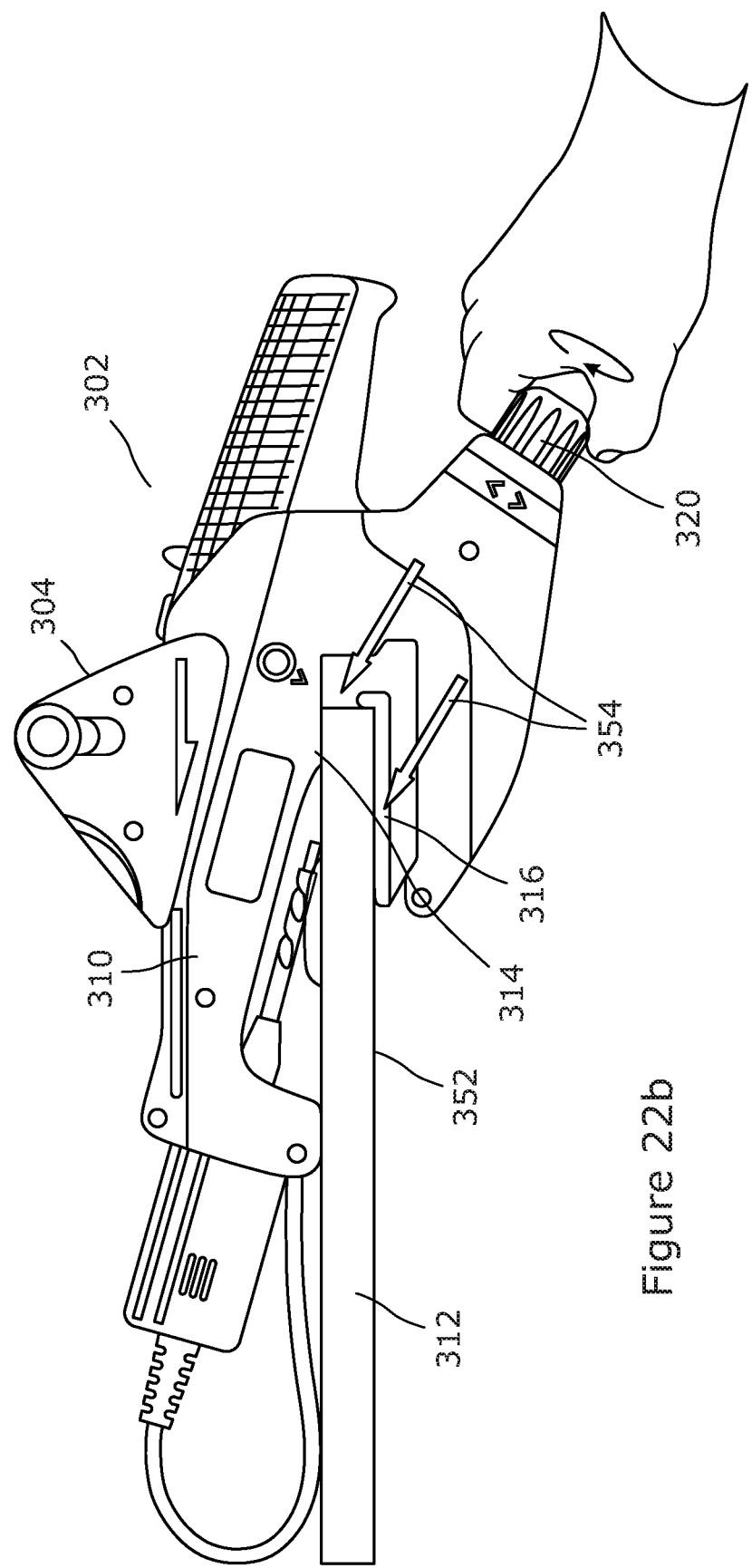
Figure 22C:
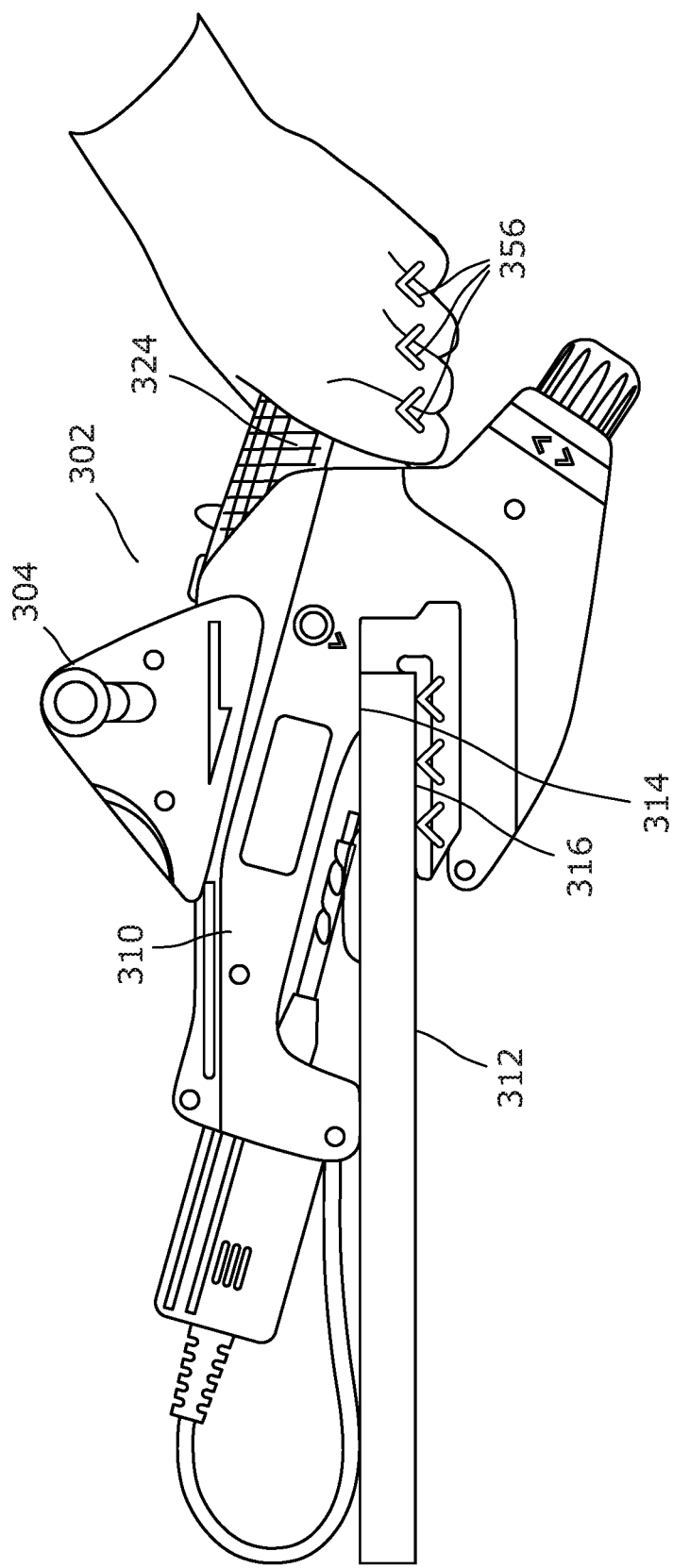

Turning now to FIGS. 22a-g there are illustrated the steps which can be followed in using the apparatus in accordance with the embodiment shown in FIGS. 21a and b. In FIG. 22a the workpiece 312 is moved in the direction of arrow 350 into the space defined between clamping plates 314, 316. With the workpiece in position between the plates 314, 316, the adjustment means knob 320 is rotated to adjust the position of the plate 316 to move the same towards the underside 352 of the workpiece as illustrated by arrows 354 in FIG. 22b and hence clamp the workpiece between the plates 314, 316 with fine adjustment of the clamping means plate 316 achieved by the gripping and movement of the gripping portion 324 of the adjustment means as indicated by arrows 356 in FIG. 22c.

Figure 22D:
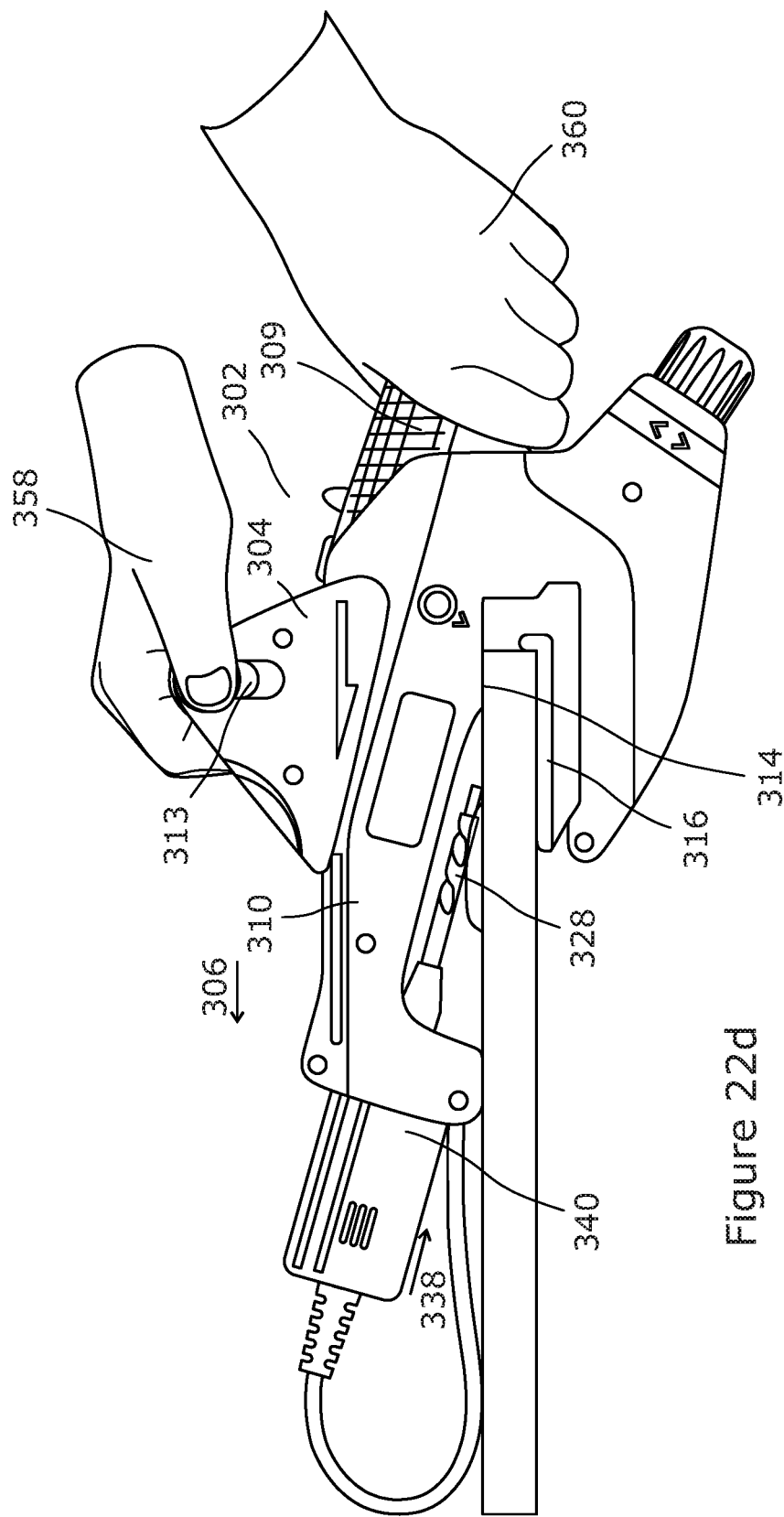
Figure 22E:
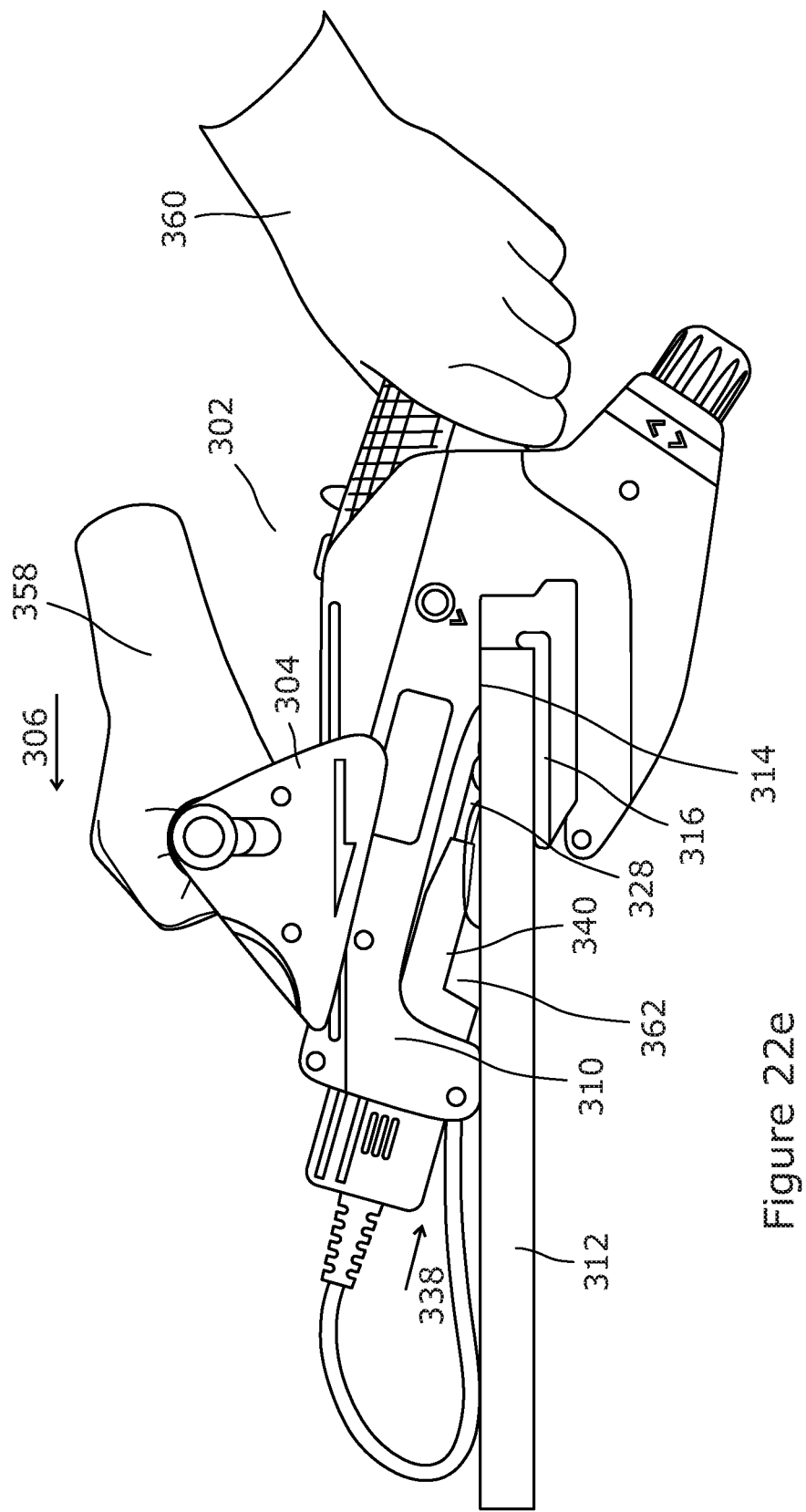

With the workpiece 312 clamped in position the user then holds the first part 304 with a first hand 358 and grips the second part 310 with their second hand 360 at handle 309 as shown in FIG. 22d. The user can then operate the portion 311 and switch 313 to release the first part 304 for movement with respect to the second part 310 and the first part 304 is then slid in the direction of arrow 306 to the position as shown in FIG. 22e. In one embodiment there is provided a sensor to detect the presence of the workpiece and if the workpiece is not detected the motor is not operable, and/or the first part 304 cannot be moved. Furthermore instead of, or in addition to this, the operation of the portion 311 and switch 313 allows the movement of a mechanical linkage in the apparatus which when moved allows mechanical movement of the part 304 and drill bit holder assembly 340 to be possible and also allows operation of the motor to be possible and performed preferably prior to mechanical movement, in one embodiment via a reed switch detection, so that the drill bit 328 will be rotating before the same contacts with the workpiece. As the first part 304 is moved to this position movement translation means within the apparatus which are connected to the drill bit holder assembly 340 cause the drill bit holder assembly 340 to move in the direction indicated by arrow 338 and the drill bit 328 to enter into the workpiece 312 as shown in FIG. 22e. The movement of the drill bit 328 is viewable through the clear window 362.

Figure 22F:
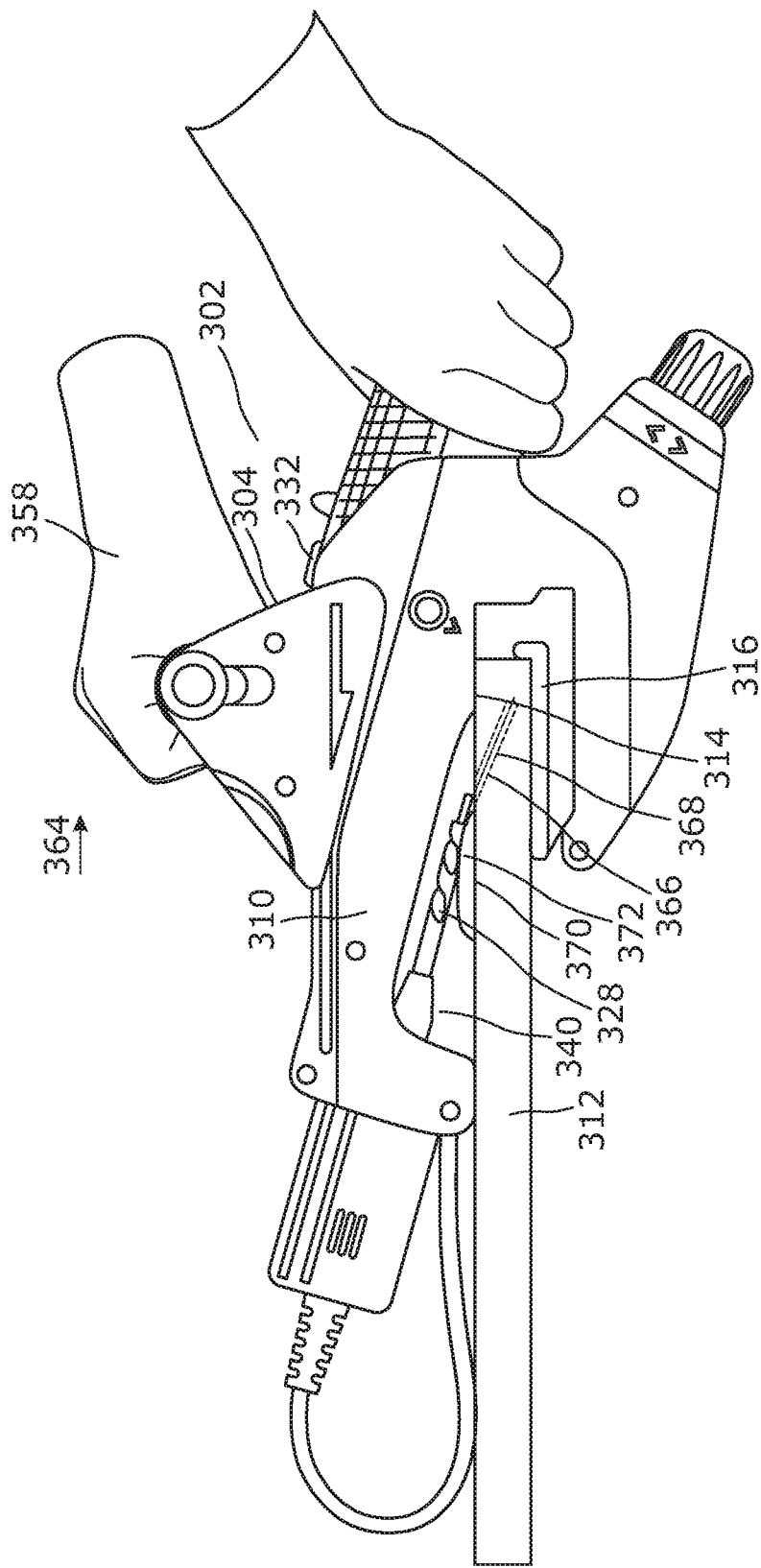

When the hole has been formed, the user moves the part 304 in the direction of arrow 364 which withdraws the drill bit holder assembly 340 and drill bit 328 from the workpiece 312 as shown in FIG. 22f. Also when moved back to the start position the first part 304 acts to operate the unclamp switch 332 and release the clamping means plate 316 so that the workpiece 312 with the hole 366 drilled, with a longitudinal axis 368 therein at the required angle with respect to the surface 370 at which the drill bit 328 entered the workpiece 312, can be removed from the apparatus.

Figure 22G:
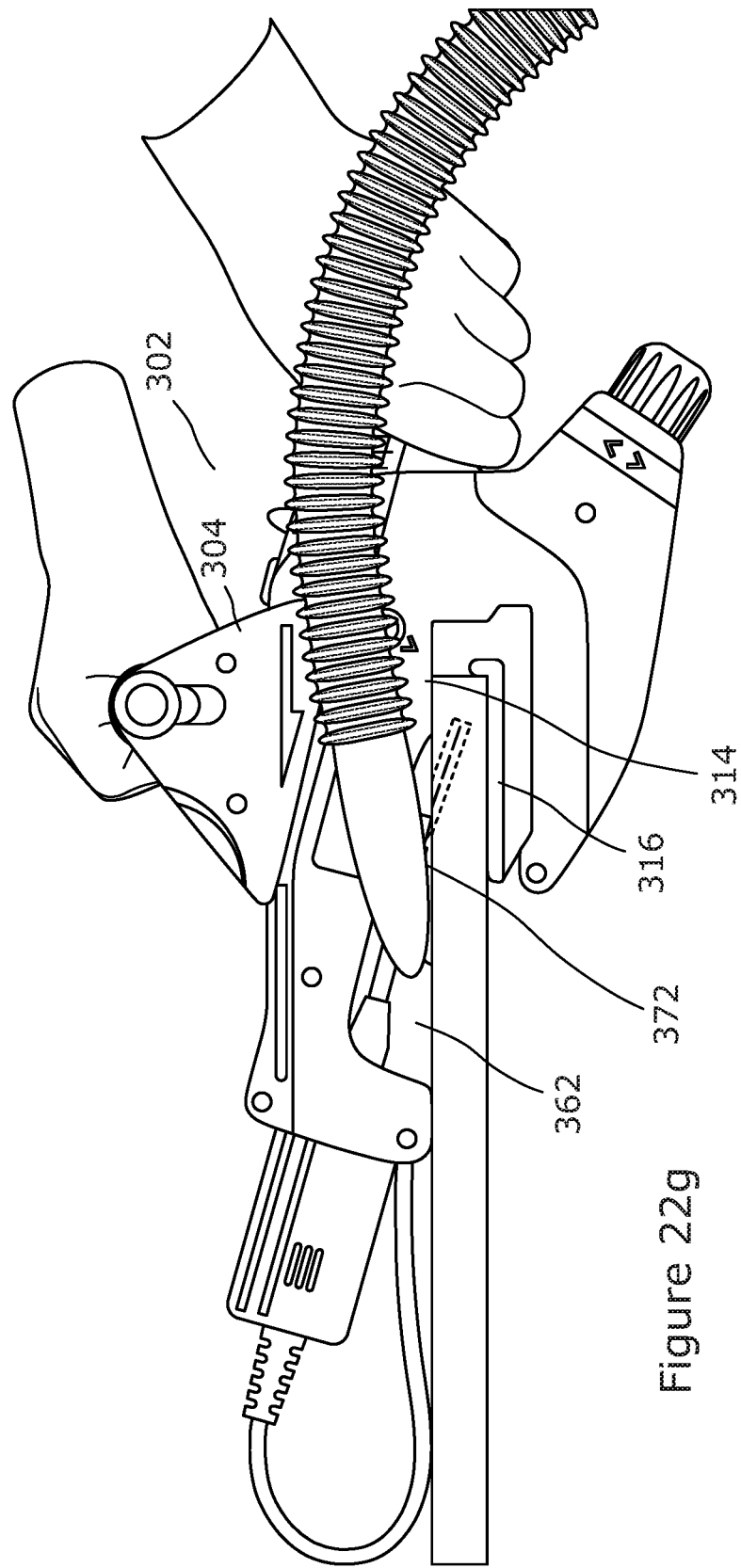

As shown in FIG. 22g, dust extraction apparatus can be used on either side of the window 362 to extract dust and debris from the work area through the aperture 372 so as to clear the same and make it available for the next drilling operation.

The invention claimed is:

1. A hole drilling apparatus, said apparatus hand held in use and including a drill bit, a motor for selectively providing a driving force to the drill bit, clamping means which, when applied to a workpiece in which a hole is to be drilled, clamp the workpiece in position with respect to the apparatus and wherein the apparatus includes a first part which is provided to be slidingly movable by the user relative to a second part of the apparatus so as to cause the advancement of the drill bit holder assembly and drill bit, as it is driven to rotate, into the work-piece to form the hole wherein the first part includes a first handle and a second handle is mounted on the second part and when both handles are gripped by the user and relative movement between said first and second handles is caused by the user said advancement of the drill bit holder assembly and drill bit occurs, wherein the first part is movable in a first direction in order to advance the drill bit holder assembly and drill bit into the workpiece in a second direction as the drill bit is driven to rotate and thus form the hole and wherein the second direction is substantially opposed to the first direction.

2. Apparatus according to claim 1 wherein the second direction is angularly offset to the first direction.

3. Apparatus according to claim 1 wherein the clamping means allow the workpiece to be clamped with respect to the apparatus such that the hole is formed with a longitudinal axis in a range of between 10 and 25° to the surface of the workpiece into which the drill is advanced to form the hole therein.

4. Apparatus according to claim 1 wherein an adjustment means allows the user to selectively set the clamping means and distance of advancement of the drill bit into the workpiece with respect to the thickness of the workpiece.

5. Apparatus according to claim 4 wherein the adjustment includes the user actuation of the adjustment means to adjust a clamping plate of the clamping means which also controls a depth stop for the drill bit holder assembly.

6. Apparatus according to claim 1 wherein the first part includes a switch connected to movement translation means such that the operation of the same moves the drill bit holder assembly and operates the motor prior to the drill bit reaching the workpiece.

7. Apparatus according to claim 6 wherein the movement translation means include at least one sprocket gear wheel and at least one toothed member to allow the movement of the first part to be translated to the movement of the drill bit holder assembly and drill bit.

8. Apparatus according to claim 1 wherein the apparatus is portable and operable when held by both hands of a user.

9. A hole drilling apparatus, said apparatus hand held in use and including a drill bit, a motor for selectively providing a driving force to the drill bit, clamping means which, when applied to a workpiece in which a hole is to be drilled, clamp the workpiece in position with respect to the apparatus and wherein the apparatus includes a first part which is provided to be slidingly movable by the user relative to a second part of the apparatus so as to cause the advancement of the drill bit holder assembly and drill bit, as it is driven to rotate, into the work-piece to form the hole wherein the first part includes a first handle and a second handle is mounted on the second part and when both handles are gripped by the user and relative movement between said first and second handles is caused by the user said advancement of the drill bit holder assembly and drill bit occurs, wherein the depth of the hole which is formed in the workpiece is set in relation to the thickness of the workpiece which is indicated by the position of at least one plate or jaw of the clamping means and wherein the workpiece is clamped in a slot defined by opposing jaws or plates of the clamping means and the at least one jaw or plate is moveable with respect to another jaw or plate so as to match the spacing apart of the jaws or plates to the thickness of the workpiece and a clamping force is exerted by the jaws or plates on the workpiece.

10. Apparatus according to claim 9 wherein a user operable adjustment means is provided to allow adjustment of the movable jaw or plate and movement of the adjustment means is synchronised with the control of the depth to which the drill bit is advanced into the workpiece when operated to form the hole.

11. Apparatus according to claim 9 wherein the drill bit holder assembly is slidingly movable with respect to the second part of the apparatus so as to advance and withdraw the drill bit into and from the workpiece and drive means to which the drill bit is connected, allow the same to be rotated as it is advanced into the workpiece.

12. A hole drilling apparatus, said apparatus hand held in use and including a drill bit, a motor for selectively providing a driving force to the drill bit, clamping means which, when applied to a workpiece in which a hole is to be drilled, clamp the workpiece in position with respect to the apparatus and wherein the apparatus includes a first part which is provided to be slidingly movable by the user relative to a second part of the apparatus so as to operate a drive assembly to cause the advancement of the drill bit holder assembly and drill bit, as it is driven to rotate, into the work-piece to form the hole and wherein the drive assembly includes at least one sprocket wheel and at least one first toothed track and at least one second toothed track which, when the drive assembly is operated, simultaneously move with respect to the at least one sprocket wheel.

* * * * *